(12) United States Patent
Krause et al.

(10) Patent No.: US 11,599,688 B2
(45) Date of Patent: Mar. 7, 2023

(54) MULTI-LAYER CYBER-PHYSICAL SYSTEMS SIMULATION PLATFORM

(71) Applicant: NOBLIS, INC., Reston, VA (US)

(72) Inventors: Cory Krause, Rockville, MD (US); Mark Jason Sanders, Reston, VA (US); Ilya L. Basin, Vienna, VA (US); Mychal William Joseph Ivancich, Reston, VA (US); Shane Dillon Mitchell, Reston, VA (US); Nicholas Gregory Kaufman, Seattle, WA (US); John Fant, Haymarket, VA (US)

(73) Assignee: NOBLIS, INC., Reston, VA (US)

( * ) Notice: Subject to any disclaimer, the term of this patent is extended or adjusted under 35 U.S.C. 154(b) by 890 days.

(21) Appl. No.: 16/276,894

(22) Filed: Feb. 15, 2019

(65) Prior Publication Data

US 2019/0266297 A1 Aug. 29, 2019

Related U.S. Application Data

(60) Provisional application No. 62/634,949, filed on Feb. 26, 2018.

(51) Int. Cl.
*G06Q 10/00* (2012.01)
*G06F 30/20* (2020.01)
(Continued)

(52) U.S. Cl.
CPC ......... *G06F 30/20* (2020.01); *G05B 23/0245* (2013.01); *G06F 11/006* (2013.01);
(Continued)

(58) Field of Classification Search
None
See application file for complete search history.

(56) References Cited

U.S. PATENT DOCUMENTS

| | | | | |
|---|---|---|---|---|
| 9,985,825 | B2* | 5/2018 | Huang | H04W 4/02 |
| 2008/0215302 | A1* | 9/2008 | Nasle | G06F 30/20 |
| | | | | 703/13 |

(Continued)

OTHER PUBLICATIONS

Nozhenkova, Ludmila, Simulation Infrastructure Design on the Basis of the Space Industry's International Standards, 2017, CAAI, https://www.atlantis-press.com/article/25881136.pdf, p. 1-4. (Year: 2017).*

(Continued)

*Primary Examiner* — Joseph M Waesco
(74) *Attorney, Agent, or Firm* — Morrison & Foerster LLP

(57) ABSTRACT

Systems and methods for simulating cyber-physical systems are disclosed. A plurality of geographic simulation layers representing respective infrastructure sectors of a real-world environment may be generated, and the layers may be linked together with one another to create a multi-layer simulation. The associations between the layers of the simulation may be adjusted, and characteristics of the simulation layers themselves may be adjusted, to ensure that the simulation conforms to characteristics of the real-world environment being simulated. In some embodiments, a multi-user simulation system allows users at separate terminals to execute attack inputs and defense inputs against the simulation to try to destabilize and stabilize the simulation, respectively. Results of the attack inputs and defense inputs may be simultaneously displayed on a plurality of terminals.

15 Claims, 28 Drawing Sheets

(7 of 28 Drawing Sheet(s) Filed in Color)

(51) Int. Cl.

| | |
|---|---|
| *G06Q 50/06* | (2012.01) |
| *G06F 11/00* | (2006.01) |
| *H04L 9/40* | (2022.01) |
| *G06Q 10/0635* | (2023.01) |
| *G06F 21/56* | (2013.01) |
| *G06F 21/57* | (2013.01) |
| *G05B 23/02* | (2006.01) |
| *G06F 11/34* | (2006.01) |

(52) U.S. Cl.
CPC .......... *G06F 11/008* (2013.01); *G06F 21/566* (2013.01); *G06F 21/577* (2013.01); *G06Q 10/0635* (2013.01); *G06Q 50/06* (2013.01); *H04L 63/1425* (2013.01); *G06F 11/3457* (2013.01)

(56) References Cited

U.S. PATENT DOCUMENTS

| | | | | |
|---|---|---|---|---|
| 2010/0162156 | A1* | 6/2010 | Tolone | G06Q 10/10 715/771 |
| 2010/0211912 | A1* | 8/2010 | Williams | H04W 16/18 715/810 |
| 2011/0022198 | A1* | 1/2011 | Plache | G05B 19/41845 700/86 |
| 2014/0172393 | A1* | 6/2014 | Kang | H04L 41/145 703/6 |
| 2014/0365196 | A1* | 12/2014 | Melander | H04L 41/12 703/13 |
| 2017/0098020 | A1 | 4/2017 | Samuel et al. | |
| 2017/0201413 | A1* | 7/2017 | Marinelli | H04L 41/0681 |
| 2017/0201425 | A1* | 7/2017 | Marinelli | G06F 11/3058 |
| 2017/0249402 | A1 | 8/2017 | Liu et al. | |
| 2017/0316324 | A1* | 11/2017 | Barrett | G06N 20/20 |
| 2017/0371074 | A1* | 12/2017 | Elkabetz | G01W 1/10 |
| 2018/0067832 | A1* | 3/2018 | Suzuki | G06F 11/28 |
| 2018/0095619 | A1* | 4/2018 | Liu | G06F 30/20 |
| 2018/0159881 | A1* | 6/2018 | Crabtree | H04L 63/1425 |
| 2019/0259108 | A1* | 8/2019 | Bongartz | A01G 7/045 |
| 2019/0324437 | A1* | 10/2019 | Cella | G06N 3/049 |
| 2019/0324438 | A1* | 10/2019 | Cella | G05B 19/41865 |
| 2019/0349426 | A1* | 11/2019 | Smith | H04L 63/123 |
| 2019/0372798 | A1* | 12/2019 | Soya | H04L 12/2814 |
| 2020/0027096 | A1* | 1/2020 | Cooner | G06Q 40/04 |
| 2020/0042658 | A1 | 2/2020 | Basin | |
| 2020/0225655 | A1* | 7/2020 | Cella | G05B 23/024 |
| 2020/0310946 | A1 | 10/2020 | Nelson et al. | |
| 2020/0342511 | A1* | 10/2020 | Bursey | G06Q 10/101 |
| 2021/0036930 | A1* | 2/2021 | Marinelli | H04L 41/22 |
| 2022/0046779 | A1* | 2/2022 | Mirsky | H04W 4/38 |
| 2022/0057254 | A1* | 2/2022 | Ji | G02F 1/295 |
| 2022/0070211 | A1* | 3/2022 | Keshtkarjahromi | G06F 21/6218 |

OTHER PUBLICATIONS

Basin, Notice of Allowance dated May 4, 2021, directed to U.S. Appl. No. 16/381,282; 14 pages.

Biagi et al. "Using Simulation to Evaluate LTE Load Control for Priority Users," Winter Simulation Conference, Dec. 11-14, 2016, Arlington, Virginia; pp. 3177-3188.

Fischer et al. "On the Relationship Between the Low Latency Queueing and the Non-Preemptive Priority Queueing Model," 9th INFORMS Telecommunications Conference, Mar. 27-29, 2008, College Park, Maryland; 27 pages.

Garbin et al. "Using Event Simulation to Evaluate Internet Protocol Enhancements for Special Services," Winter Simulation Conference, Dec. 9-12, 2007, Washington, D.C.; pp. 2276-2284.

Gordon et al. "UMTS Load Control with Access Class Barring," IEEE Military Communications Conference (MILCOM), Oct. 6-9, 2014, Baltimore, Maryland; pp. 1009-1014.

Masi et al. "Measuring Resilience in Multi-Carrier Emergency and Critical Telecommunications Systems," IEEE Military Communications Conference (MILCOM), Nov. 17-19, 2008, San Diego, California; 7 pages.

Masi et al. "Simulating Network Cyber Attacks Using Splitting Techniques," Winter Simulation Conference, Dec. 11-14, 2011, Phoenix, Arizona; pp. 3212-3223.

Masi et al. "Voice over Internet Protocol (VoIP) Performance Models—A Comprehensive Approach," International Conference on Telecommunication Systems, Nov. 17-20, 2005, Dallas, Texas; 29 pages.

Shortle et al. "An Effective Rare-event Simulation Technique and Its Application to Cyber Security and Electric Grid," Workshop on Grand Challenges in Modeling, Simulation and Analysis for Homeland Security (MSAHS), Mar. 17-18, 2010, Arlington, Virginia; 6 pages.

* cited by examiner

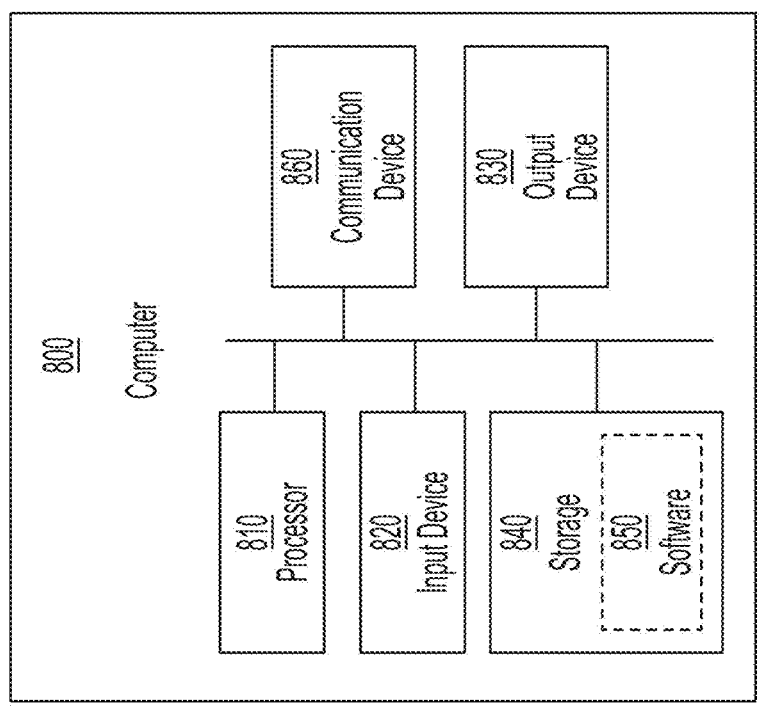

MULTI-LAYER CYBER-PHYSICAL SYSTEMS SIMULATION PLATFORM

CROSS-REFERENCE TO RELATED APPLICATIONS

This application claims the benefit of U.S. Provisional Application No. 62/634,949, entitled, "MULTI-LAYER CYBER-PHYSICAL SYSTEMS SIMULATION PLATFORM," filed Feb. 26, 2018, the entire contents of which are incorporated herein by reference.

FIELD OF THE INVENTION

This relates generally to simulation platforms, and more specifically to platforms for simulating multi-layer cyber-physical systems.

BACKGROUND OF THE INVENTION

The Department of Homeland Security has identified 16 critical infrastructure sectors that are regulated under the National Cybersecurity Framework; the 16 sectors include communication, energy, and transportation. According to DHS, "incapacitation or destruction [of these sectors] would have a debilitating effect on security, national economic security, national public health or safety."

Despite the critical need for security and stability of these sectors, complex networks continue to be hacked and brought down each year under Distributed Denial of Service (DDoS) attacks, or explored for private or sensitive information. Additionally, operators of systems in these sectors are currently ill-prepared to detect, analyze, understand, and respond to disruptions that may affect multiple different critical sectors at once.

For example, in 2003, the second-largest blackout in history was caused for the northeast United States and Canada due to an undetected software bug. The bug caused the usual control room alarms not to alert during an electrical surge, allowing the server and backup server to go offline without workers' knowledge. A chain reaction caused 265 power plants to shut down, causing power outages for 55 million people. The water supply lost pressure in areas of New Jersey and Ontario, forcing residents to pump and boil water due to unsafe drinking conditions. Amtrak's northeast corridor shut down, affecting commuters from Boston to Washington. Chicago and Ontario's train systems were also shut down. Communication networks all over the northeast were dramatically affected due to loss of backup power. Millions of cell phone users could not make calls, and home phones were significantly impacted as well. The cause was eventually traced to a software bug at an Ohio power distributor. However, at the time, 55 million people were affected, with no known cause, solution, or plan. It took two days to restore power, and three months to identify the true cause of the issue. There simply was no way of knowing where the problem originated, what caused the issue, and whether or not it was intentional.

In the near future, a similar outage of internet services could hit cyber-physical systems (CPS), this time affecting the millions of devices connected to the internet, connected vehicles, automated vehicles, communication towers, and more.

Simulating a CPS before outages arise may allow operators of the systems (e.g., local governments, utility companies, emergency services providers) to plan for and respond faster to these outages, attacks, and simple system deterioration. Knowledge of how these systems fail may allow agencies to identify the cause efficiently. Incorporating electrical, communications, transportation, weather, and cyber-attacks is required to enter the next frontier of critical infrastructure management and security at an operational scale. Prior research in this area has focused on isolated systems or simple combinations of layers under average day conditions. Our approach focuses on representing outlier conditions in a rapidly emerging connected infrastructure that includes connected and automated vehicles, wireless roadside sensors, communications systems, and the underlying dynamics of the electrical grid system under stress or attack.

SUMMARY OF THE INVENTION

As discussed above, critical infrastructure sectors are currently insufficiently-equipped to detect, analyze, understand, and respond to disruptions that may affect multiple different critical sectors at once. Accordingly, there is a critical need for improved systems, methods, and techniques for understanding and analyzing interconnected infrastructure sectors, including the ways that these interconnected infrastructure sectors may respond and behave when subjected to disruptions such as cyber-attacks, weather events, natural disasters, increased travel demands, or other disruptions compromising or effecting one or more infrastructure elements.

Disclosed herein are systems and methods for creating and implementing a holistic, integrated simulation platform focused on the connectedness of multi-layered cyber-physical systems; such a simulation platform may address the needs discussed above. The Integrated CPS Simulation Platform may incorporate several layers of the connected world—electrical, communication, transportation (including connected vehicles), water, weather, etc.—and may enable users to simulate these environments in interaction with one another. Simulating the interaction of these environments at scale may enable users to identify second- and third-order effects caused by the interaction of the layers, as well as to assess dependencies and vulnerabilities among the complex systems represented by the layers. Combining these layers into an integrated simulation platform allows users to understand causal relationships and forecast events that may otherwise be overlooked. Users may explore the resilience/vulnerabilities of the combined integrated model under stresses stemming from factors such as severe weather conditions and/or intentional cyber-disruption. The systems and methods disclosed herein may enable users to understand and prepare for real-world events in which all or part of one or more of the systems represented by the simulated layers are compromised, such as in the event of a cyber-attack, weather event, natural disaster, increased travel demand, or other disruption compromising or effecting one or more infrastructure elements. The nature of disruptions simulated by the system may be overt (e.g., loss of power) or subtle (e.g., changes in automated vehicle operation), and they may be localized or generalized The systems and methods disclosed herein may allow users to identify interdependencies and refine the types of information needed to be passed among the simulated layers. By modeling multiple layers in a single simulation model, when one or more of the layers are stressed, or at near capacity, users of the model will be better positioned to understand the causal relationships between the layers so that they can better understand the interrelationships between CPSs. For example, when the system is under stress, attributes of system dynamics may lead to rapid identification and response to the root cause(s) of a specific problem. For example, users may be able to gain insight as to whether communication network performance degraded from localized demand or loss of capacity (or both), whether traffic flow is disrupted from a stalled vehicle or some other cause, or whether power was cut to street lights due to an ice storm that took an electrical substation offline or due to another cause. The overall model platform may be a valuable tool for determining the connections between systems, how the system is able to respond to changes of its connected systems, and what ultimately happens when the system must interact when some of their resources are offline.

Numerous scenarios can be further explored using the integrated simulation modeling platform, which may link geospatially-similar information from different layers in various associations with one another. The techniques disclosed herein comprise a replicable simulation methodology that may predict and classify integrated system dynamics to reveal and characterize high-risk vulnerabilities. For example, by overloading important aspects of the simulation model, it is possible to understand how the overall network responds when one (or more) of the CPS layers (e.g., transportation, electric, and communications) is under stress.

The Integrated CPS Simulation Platform may be used to create an interactive attack/defense simulation system in which different users may both execute actions on the same simulation of an environment. For example, an attacking user may execute actions intended to disrupt the environment, while the defending user may execute actions intended to counteract the attacking actions and/or to stabilize the environment. In some embodiments, the interactive attack/defense simulation system may include a turn-based exchange where attacking users and defending users execute commands in turn from separate terminals both operating on the same simulation. By using an interactive attack/defense simulation system in accordance with the Integrated CPS Simulation Platform disclosed herein, users may train to respond to real-world events such as cyber-attacks, weather events, natural disasters, increased travel demands, or other disruptions compromising or effecting one or more infrastructure elements.

In some embodiments, a first system for simulating cyber-physical systems using a multi-layer data structure is provided, the first system comprising: one or more processors; and memory storing one or more programs, wherein the one or more programs are configured to be executable by the one or more processors to cause the system to: receive, at the system, data representing infrastructure elements in a real-world environment, wherein the plurality of infrastructure elements represented in the data are associated with respective geographic metadata in the data; generate and storing a plurality of geographic simulation layers representing the real-world environment, based on the received data; for each simulation layer of the plurality of simulation layers, generate and store data representing associations of each of a first plurality of infrastructure elements in the layer with each of a second plurality of infrastructure elements across two or more other simulation layers of the plurality of simulation layers, based on the geographic metadata associated with the first plurality of infrastructure elements and on the geographic metadata associated with the second plurality of infrastructure elements; execute a first multi-layer simulation based on the data representing the associations between the plurality of simulation layers; modifying the data representing the associations between the plurality of simulation layers; and execute a second multi-layer simulation, based on the modified data representing the associations between the plurality of simulation layers.

In some embodiments of the first system, each of the plurality of geographic simulation layers represents a different one of a plurality of infrastructure sectors of the real-world environment.

In some embodiments of the first system, the plurality of infrastructure sectors comprise three or more of an electrical sector, a transportation sector, a communications sector, a water sector, a fuel sector, and a consumables sector.

In some embodiments of the first system, generating and storing data representing associations between infrastructure elements comprises associating a pair of infrastructure elements with one another if the geographic metadata respectively associated with each of the pair of infrastructure elements indicates that the pair of infrastructure elements are within a predefined geographical distance of one another.

In some embodiments of the first system, generating and storing data representing associations between infrastructure elements comprises not associating a pair of infrastructure elements with one another if the geographic metadata respectively associated with each of the pair of infrastructure elements indicates that the pair of infrastructure elements are not within a predefined geographical distance of one another.

In some embodiments of the first system, generating and storing data representing associations between infrastructure elements comprises assigning an intensity to an association between a pair of infrastructure elements on the basis of the geographic distance between the pair of infrastructure elements indicated by the metadata respectively associated with each of the pair of infrastructure elements.

In some embodiments of the first system, modifying the data representing the associations between the plurality of simulation layers is based on information about the real-world environment received after execution of the first multi-layer simulation.

In some embodiments of the first system, modifying the data representing the associations between the plurality of simulation layers is based on comparing characteristics of the first multi-layer simulation to characteristics of the real-world environment.

In some embodiments of the first system, modifying the data representing the associations between the plurality of simulation layers comprises modifying the data such characteristics of the second multi-layer simulation are more similar than the characteristics of the first multi-layer simulation to characteristics of the real-world environment.

In some embodiments of the first system, modifying the data representing the associations between the plurality of simulation layers comprises one or more of associating one or more elements with one another that were not previously associated, disassociating one or more elements with one another that were previously associated, or modifying a manner in which one or more elements are associated with one another.

In some embodiments, a first method for simulating cyber-physical systems on a simulation system using a multi-layer data structure, the first method comprising: receiving, at the simulation system, data representing infrastructure elements in a real-world environment, wherein the plurality of infrastructure elements represented in the data are associated with respective geographic metadata in the data; generating and storing a plurality of geographic simulation layers representing the real-world environment, based on the received data; for each simulation layer of the plurality of simulation layers, generating and storing data representing associations of each of a first plurality of infrastructure elements in the layer with each of a second plurality of infrastructure elements across two or more other simulation layers of the plurality of simulation layers, based on the geographic metadata associated with the first plurality of infrastructure elements and on the geographic metadata associated with the second plurality of infrastructure elements; executing a first multi-layer simulation based on the data representing the associations between the plurality of simulation layers; modifying the data representing the associations between the plurality of simulation layers; and executing a second multi-layer simulation, based on the modified data representing the associations between the plurality of simulation layers.

In some embodiments, a first non-transitory computer-readable storage medium for simulating cyber-physical systems using a multi-layer data structure is provided, the first non-transitory computer-readable storage medium comprising instructions configured to be executed by one or more processors to cause the one or more processors to: receive, at the system, data representing infrastructure elements in a real-world environment, wherein the plurality of infrastructure elements represented in the data are associated with respective geographic metadata in the data; generate and storing a plurality of geographic simulation layers representing the real-world environment, based on the received data; for each simulation layer of the plurality of simulation layers, generate and store data representing associations of each of a first plurality of infrastructure elements in the layer with each of a second plurality of infrastructure elements across two or more other simulation layers of the plurality of simulation layers, based on the geographic metadata associated with the first plurality of infrastructure elements and on the geographic metadata associated with the second plurality of infrastructure elements; execute a first multi-layer simulation based on the data representing the associations between the plurality of simulation layers; modifying the data representing the associations between the plurality of simulation layers; and execute a second multi-layer simulation, based on the modified data representing the associations between the plurality of simulation layers.

In some embodiments, a second system for simulating cyber-physical systems using an interactive, multi-user, multi-layer data structure is provided, the second system comprising: one or more processors configured to simulate cyber-physical systems using a multi-layer data-structure; a first terminal configured to display information regarding simulated cyber-physical systems and to detect inputs regarding control of the simulated cyber-physical systems; a second terminal configured to display information regarding simulated cyber-physical systems and to detect inputs regarding control of the simulated cyber-physical systems; and memory storing one or more programs, wherein the one or more programs are configured to be executable by the one or more processors to cause the system to: at the first terminal and the second terminal, display a multi-layer cyber-physical systems simulation depicting a real-world environment; at the first terminal, detect a first input comprising an instruction to execute a first action against the simulation; at the second terminal, detect a second input comprising an instruction to execute a second action against the simulation; and after detection of the first input and the second input, display effects of the first action and the second action on the simulation at the first terminal and at the second terminal.

In some embodiments of the second system: the first action is an attack action selected from a menu of attack action options displayed at the first terminal and configured to destabilize one or more simulated infrastructure systems in the simulation; and the second action is a defense action selected from a menu of defense actions displayed at the first terminal and configured to stabilize one or more simulated infrastructure systems in the simulation.

In some embodiments of the second system, the one or more programs are further configured cause the system to: display a set of information regarding the simulated environment at the second terminal, wherein all or part of the set of information is not available for display at the first terminal.

In some embodiments of the second system: the first action and the second action are associated with respective predetermined unit costs; and each of the first and second terminals are configured such that users of the respective terminal are not permitted to execute actions costing more than a predetermined cost limit during a single turn.

In some embodiments of the second system, displaying effects of the first action and second action comprises calculating and displaying a first indication of a behavioral disruption level of one or more agents in the simulation in response to the effects of the first action and second action.

In some embodiments of the second system, the behavioral disruption level is determined on the basis of a ration of satisfied needs of an agent to total needs of the agent.

In some embodiments, a second method for executing an interactive, multi-user, cyber-physical systems simulation is provided, the second method comprising: at a first terminal and a second terminal, displaying a multi-layer cyber-physical systems simulation depicting a real-world environment; at the first terminal, detecting a first input comprising an instruction to execute a first action against the simulation; at the second terminal, detecting a second input comprising an instruction to execute a second action against the simulation; after detection of the first input and the second input, displaying effects of the first action and the second action on the simulation at the first terminal and at the second terminal.

In some embodiments, a second non-transitory computer-readable storage medium for simulating cyber-physical systems using an interactive, multi-user, multi-layer data structure is provided, the second non-transitory computer-readable storage medium comprising instructions configured to be executed by one or more processors to cause a system to: at a first terminal and a second terminal of the system, display a multi-layer cyber-physical systems simulation depicting a real-world environment; at the first terminal, detect a first input comprising an instruction to execute a first action against the simulation; at the second terminal, detect a second input comprising an instruction to execute a second action against the simulation; after detection of the first input and the second input, display effects of the first action and the second action on the simulation at the first terminal and at the second terminal.

In some embodiments, any one or more features of the first system, first method, first non-transitory computer-readable storage medium, second system, second method, and/or second non-transitory computer-readable storage medium may be combined with one another.

BRIEF DESCRIPTION OF THE FIGURES

The patent or application file contains at least one drawing executed in color. Copies of this patent or patent application publication with color drawings will be provided by the office upon request and payment of the necessary fee.

FIG. 8 depicts a computer, in accordance with some embodiments.

DETAILED DESCRIPTION OF THE INVENTION

Described herein are exemplary embodiments of multi-layer simulation systems and methods that may address the problems and shortcomings of known simulation systems and methods described above.

Figure 1:
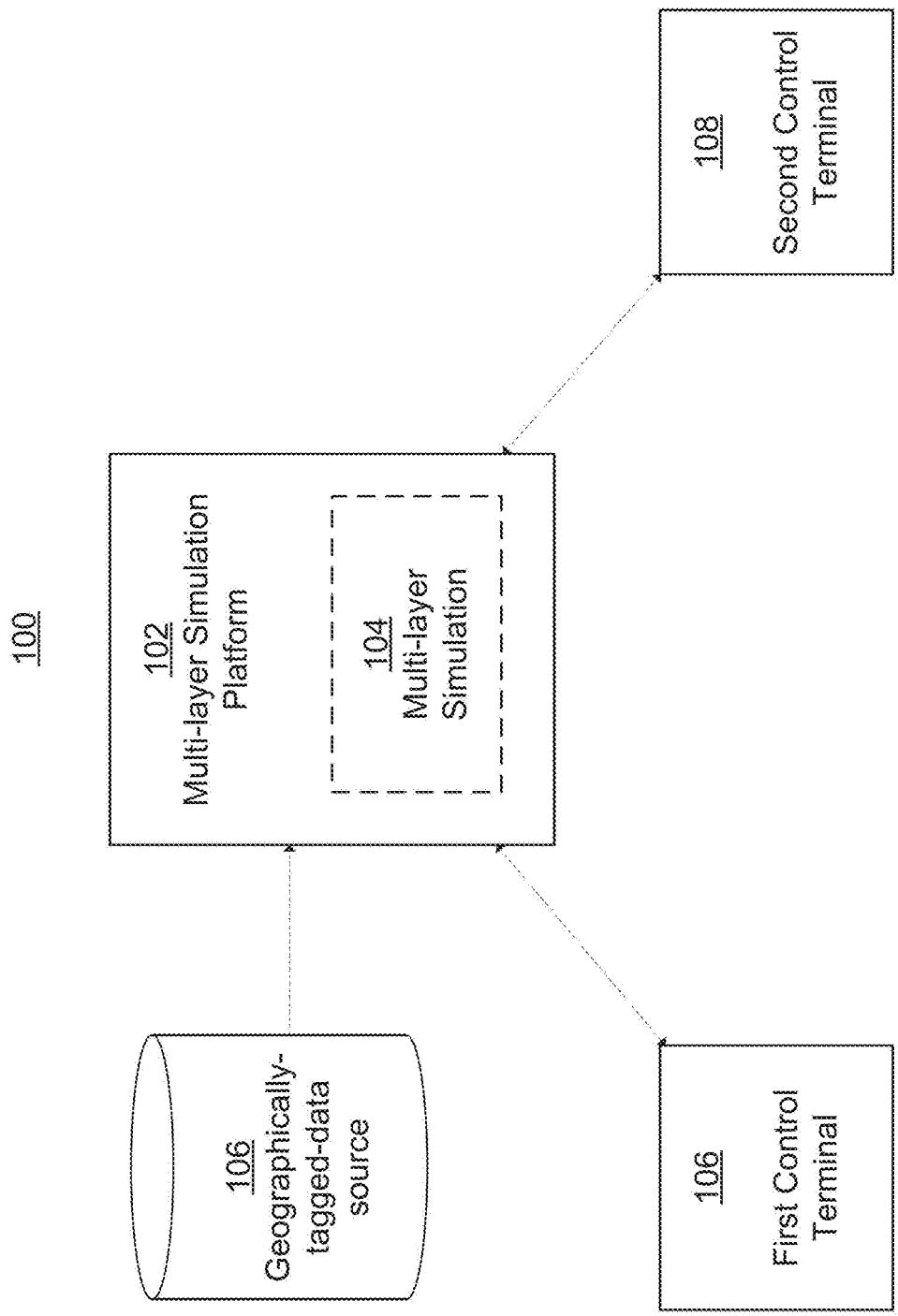
FIG. 1 depicts a multi-layer simulation system, in accordance with some embodiments.

FIG. 1 depicts a multi-layer simulation system 100, in accordance with some embodiments. As shown, system 100 may comprise multi-layer simulation platform 102, geographically-tagged-data source 106, first control terminal 106, and second control terminal 108. As described herein, platform 102 may use geographically-tagged data from source 106 to build, store, and execute multi-layer simulation 104, which may be displayed on and/or controlled by inputs received from terminals 106 and 108.

In some embodiments, multi-layer simulation platform 102 may comprise any one or more processors, personal computers, super-computers, servers, and/or virtual machines configured to execute instructions stored locally or remotely to build, store, and/or execute multi-layer simulation 104. As described herein, simulation 104 may comprise software stored configured to, when executed by one or more processors, render and display one or more simulations of real-world environments, wherein the simulations comprise a plurality of layers each representing an infrastructure sector. As discussed herein, the layers of simulation 104 may be configured to send and receive data to and from one another in order to simulate the effects that changes to one layer may have on the other layers.

In some embodiments, geographically-tagged-data source 106 may comprise any one or more databases, computer systems, file stores, sensors, real-time monitoring devices, and/or user input devices communicatively coupled to platform 102 and configured to store, generate, and/or transmit geographically-tagged data regarding one or more elements of any of the infrastructure sectors represented by layers of simulation 104. Geographically-tagged data transmitted from source 106 to platform 102 may be any data regarding any one or more infrastructure elements of any of the sectors represented by the layers of simulation 104, and it may be associated with geographic metadata indicating a location (e.g., latitude, longitude, altitude) of the one or more infrastructure elements. In some embodiments, the data may comprise data from any suitable public or private database.

Data transmitted from source 106 to platform 102 may additionally comprise information regarding outside factors or stressors that may influence infrastructure elements, such as weather events, climate information, or the like. In some embodiments, data transmitted form source 106 to platform 102 may comprise data that is not geographically-tagged, such as general information about characteristics of one or more infrastructure elements, or such as information about the manners in which one or more infrastructure elements may be expected to interact with one another. A user of system 100 may, in some embodiments, manually associate geographic metadata with data received from source 106, or the user may modify geographic metadata already associated with data received from source 106.

In some embodiments, as discussed in further detail herein, first control terminal 106 and second control terminal 108 may be control terminals configured to be communicatively coupled with platform 102 and configured to receive data from platform 102 regarding a state of simulation 104, to display a representation or rendering of simulation 104, to detect inputs entered by users of the respective terminal, and to transmit data representing the detected inputs to platform 102. Thus, a user of terminal 106 or 108 may enter an input to the terminal, and data representing the input may be transmitted to platform 102, wherein the data is configured to cause platform 102 to execute one or more changes to simulation 104. The effects of the actions executed against simulation 104, in response to the input entered by the user of the terminal 106 or 108, may then be propagated through the various layers of simulation 104 (e.g., until simulation 104 reaches a new equilibrium state), and data may then be transmitted back from platform 102 to terminals 106 and 108. The data transmitted back from platform 102 to terminals 106 and 108 may be configured to allow display of a representation or rendering of simulation 104 on terminals 106 and/or 108.

In some embodiments, as discussed further herein, system 100 may be configured to simultaneously display a representation or rendering of multi-layer simulation 104 on both terminals 106 and 108. In some embodiments, platform 102 may accept inputs from one, both, or neither of terminals 106 and 108, while still transmitting data to one or both terminals for display of simulation 104. In some embodiments, control inputs may be accepted only from approved terminals and/or only at approved times; for example, some terminals may be permitted to enter control inputs, while others may be disallowed; some terminals may be in an observer-only state where no inputs may be entered; some terminals may be permitted to enter inputs at any time; and some terminals may be permitted to entire inputs on a turn-based basis by alternating or cycling with one or more other terminals.

In some embodiments, the system may be configured such that multiple terminals may display the same representation, rendering, and/or information about multi-layer simulation 104 at the same time. In some embodiments, the system may be configured such that different terminals may simultaneously display different representations, renderings, and/or information about simulation 104 at the same time. For example, users of different terminals may control the areas and layers of simulation 104 that are displayed on their terminal such that the users at different terminals may simultaneously observe different layers and/or different geographical areas of simulation 104 at the same time.

In some embodiments, running simulation 104 may be more computationally intensive than displaying simulation 104, and platform 102 and terminals 106 and 108 may be configured accordingly. In some embodiments, platform 102 may comprise one or more supercomputers, servers, groups of servers, and/or virtual machines. In some embodiments, different layers of simulation 104 may be run on different servers in communication with one another. In some embodiments, control terminals 106 and/or 108 may be personal computers, laptops, and/or mobile computing devices communicatively coupled with platform 102. In this way, platform 102 may handle the more computationally intensive tasks of building, modifying, and/or rendering simulation 104, while terminals 106 and/or 108 may handle the less computationally intensive tasks of displaying representations, renderings, and/or information about simulation 104 and detecting and transmitting control inputs to platform 102.

Figure 2:
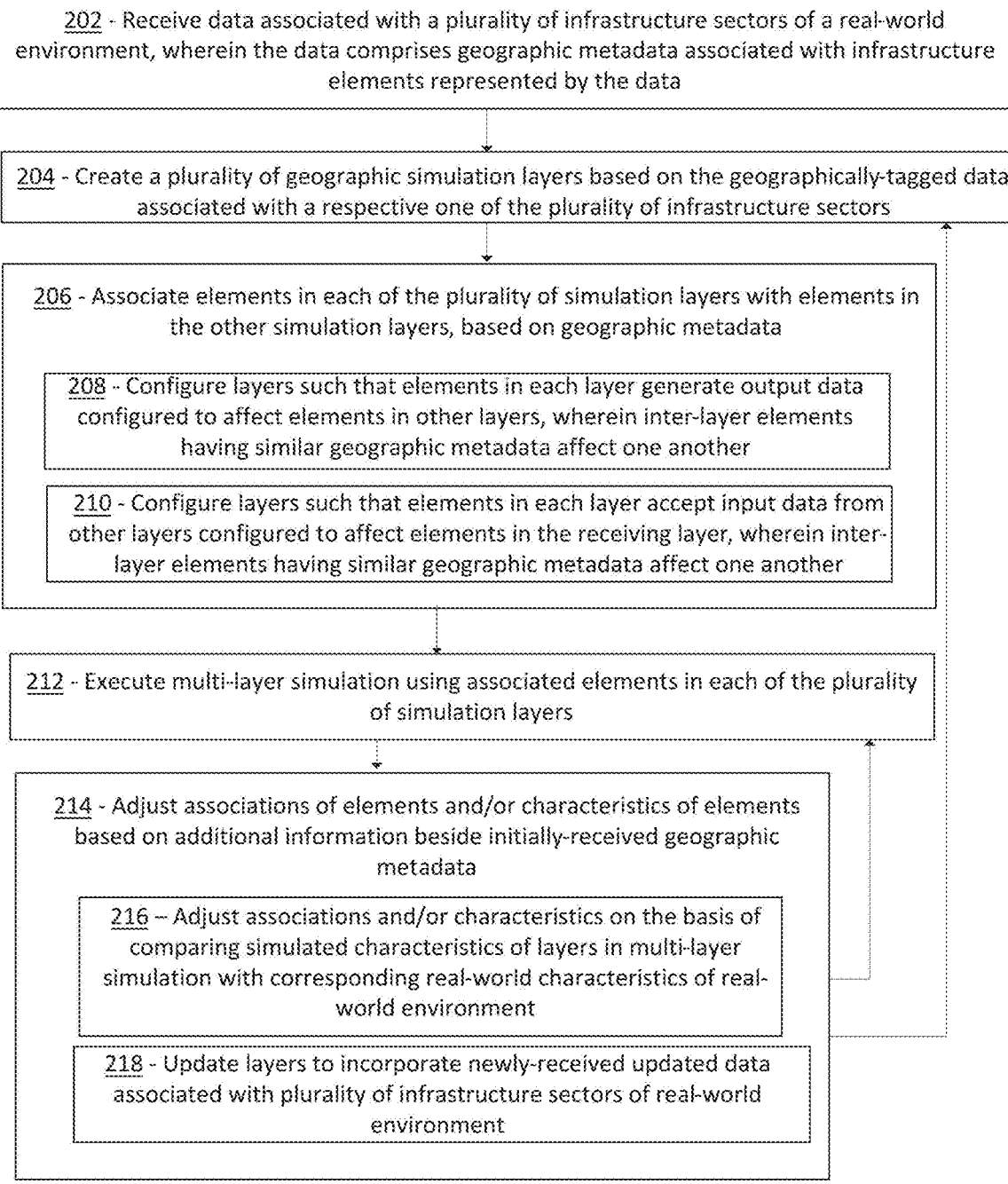
FIG. 2 is a flowchart depicting a method for creating a multi-layer simulation, in accordance with some embodiments.

FIG. 2 is a flowchart depicting a method 200 for creating a multi-layer simulation, in accordance with some embodiments. In some embodiments, the method 200 may be performed by a system such as multi-layer simulation platform 102 in conjunction with geographically tagged-data source 106, as discussed above in FIG. 1. In some embodiments, method 200 may result in the creation of multi-layer simulation 104, as discussed above in FIG. 1.

At block 202, in some embodiments, the system may receive data associated with a plurality of infrastructure sectors of a real-world environment, wherein the data comprises geographic metadata associated with infrastructure elements represented by the data. In the example of system 100 in FIG. 1, platform 102 may receive the data from source 106. As discussed above, the data received by the system may comprise geographically-tagged data regarding one or more elements of a plurality of infrastructure sectors of a real-world environment such as a road, neighborhood, town, city, county, state, country, region, or other geographic area of the real world. In some embodiments, the infrastructure sectors may comprise the electrical sector, the communications sector, the transportation sector, the plumbing sector, the sanitation sector, the fuel sector, the consumables sector, etc.

In some embodiments, elements of the electrical sector may comprise power plants of various types, solar panels, wind turbines, power stations, substations, power lines, electricity-connected homes and other buildings, and the like.

In some embodiments, elements of the transportation sector may comprise roads, bridges, parking lots, parking garages, stoplights, road signs, road construction equipment, gas stations, electric vehicle charging stations, automobiles, trains, airplanes, buses, light rail vehicles, intelligent and/or connected vehicles, public transportation vehicles, personal vehicles, and the like.

In some embodiments, elements of the communications sector may comprise telephone lines, wired network communications infrastructure (e.g., internet backbone infrastructure), wireless network communications infrastructure, cell towers, radio towers, communications satellites, mobile telephones, mobile computing devices, personal computers, servers, internet service providers, wireless service providers, internet websites, communications-connected homes and other buildings, and the like.

In some embodiments, elements of the plumbing sector may comprise water pipes, water treatment facilities, plumbing-connected homes and other buildings, and the like.

In some embodiments, elements of the fuel sector may comprise fuel pipes, water storage facilities, fuel creation or extraction facilities, fueling stations, fuel-connected homes and other buildings, and the like.

In some embodiments, elements of the consumables sector may comprise consumables sources and/or manufacturers, consumables supply chain elements, consumables stores, and the like.

In some embodiments, the system may receive data at block 202 that is already associated with geographic metadata pertaining to a particular one or more infrastructure elements represented by the data, while in some embodiments the system may itself associate received data with geographic metadata, after receiving the data. In some embodiments, in addition to geographically-tagged data, data received by the system at block 202 may comprise information regarding outside factors or stressors that may influence infrastructure elements, such as weather events, climate information, or the like. In some embodiments, data received may comprise data that is not geographically-tagged, such as general information about characteristics of one or more infrastructure elements, or such as information about the manners in which one or more infrastructure elements may be expected to interact with one another.

At block 204, in some embodiments, the system may create a plurality of geographic simulation layers based on the geographically-tagged data associated with a respective one of the plurality of infrastructure sectors. In some embodiments, the system may first individually create one simulation layer per infrastructure layer, using the information received at block 202 to create a geographically-based simulation of a plurality of infrastructure elements in the infrastructure sector. In some embodiments, each layer may be capable of being run (e.g., executing a geographic simulation over time) independently of any one of the other layers. For example, an electrical layer may comprise representations of power plants, power stations, power lines, and electricity-connected homes and buildings; while a transportation layer may comprise representations of roadways and public and private vehicles, including intelligent and/or connected vehicles (CV's). The data received at block 202 may be used to place and configure elements in each layer at the appropriate geographic location (e.g., longitude, latitude, altitude) and to configure the placed simulated elements to simulate the characteristics of the real-world elements that they represent.

In some embodiments, interconnected layers may be created in conjunction with one another, while in some embodiments layers may be developed and created independently of one another before being linked with one another in the multi-layer simulation. In some embodiments, each of the simulation layers may be created and/or run by the same server or servers, while in some embodiments they may each be created and/or run by different servers. In some embodiments, data representing each of the simulation layers may be stored in the same database or other computer storage, while in some embodiments each of the simulation layers may be stored remotely from one another.

In some embodiments, creating the plurality of geographic simulation layers comprises developing and creating a transportation layer, which may, in some embodiments, be a connected-vehicle (CV) transportation layer (e.g., a transportation layer configured to simulate vehicles that are electronically connected to communications systems and/or to one another). In some embodiments, developing and creating a transportation layer may comprise integrating CV components and behavior into the agents of the transportation model, including the communication system between vehicles and from vehicles to the infrastructure. In some embodiments, traffic simulation network models may be adapted to reflect real traffic operational conditions and to leverage the advanced features of connected and autonomous vehicles.

Figure 3:
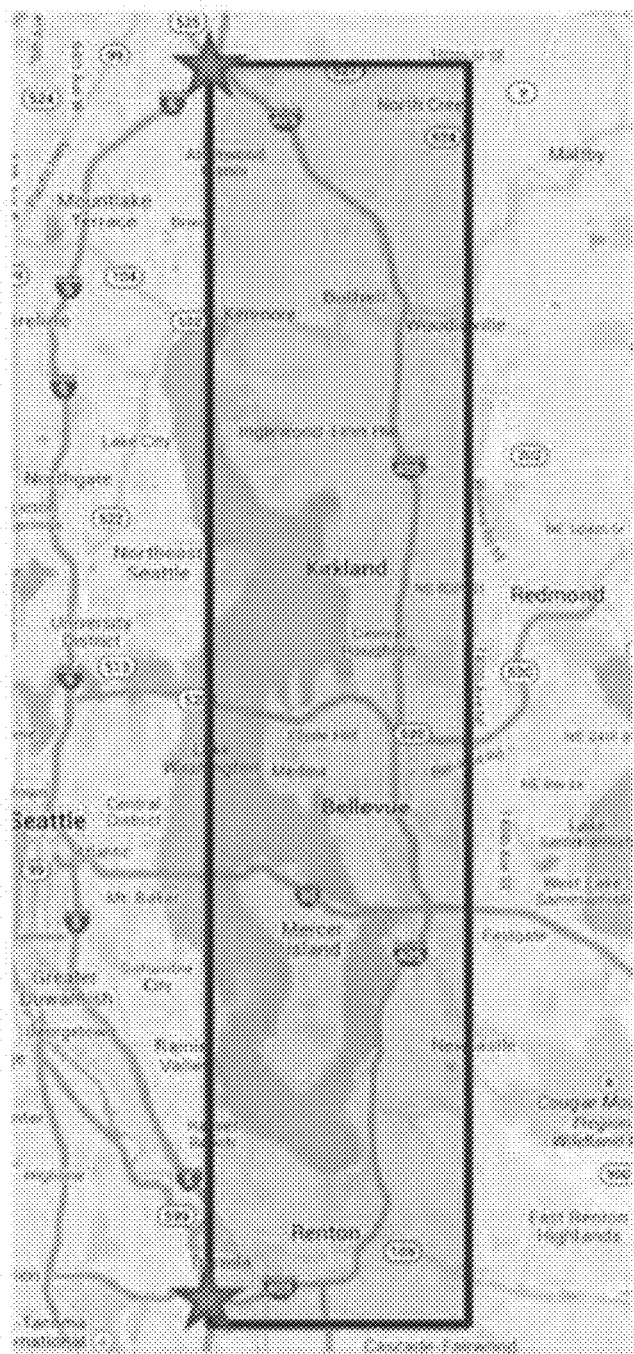
FIG. 3 depicts a geographic area for which a transportation simulation model may be created.

In one example, the Seattle I-405 traffic simulation network models may be adapted to reflect real traffic operational conditions and to leverage the advanced features of connected and autonomous vehicles. The Seattle I-405 Corridor is a major commuter corridor in the Seattle area subject to periods of high travel demand and resultant congestion. In addition, the corridor experiences significant travel-time variability as a result of dynamic incident patterns and frequent rain and fog. FIG. 3 depicts the geographical coverage of I-405 corridor, extending from a junction north of Lake Washington with I-5 to a junction rejoining I-5 south of Lake Washington. The length of the I-405 corridor is 29.5 miles. A set of VISSIM simulation models was developed by the Washington State Department of Transportation (WSDOT) for this I-405 corridor, which contains both AM and PM peak-hour simulation models. WSDOT may thus provide 2012 traffic data, travel-time information, incident data, and weather information, shown below.

Vehicle count: 15-minute vehicle count and speed from permanent detector locations approximately every ½ mile along the I-405 mainline.

Travel times: 5-minute estimated corridor travel times derived from speed data.

Incident records that contain incident time, location, incident type, and lane closure information.

Weather records (hourly) that contain temperature, wind, snow, rain, visibility/fog.

The model, created in VISSIM, may be integrated into the larger integrated CPS simulation platform for connectivity to the other layers discussed herein. By tying it into the larger model, the communication and electrical grids can affect specific functions of this model, such as traffic signals, highway lighting systems, communication to vehicles, and roadside signage.

In some embodiments, connected and autonomous vehicles may be simulated and modeled within the transportation layer on the roadway, and they may be simulated in communication with roadside units that may send messages to the vehicles; said simulation may be integrated to other layers through interdependencies (e.g., with the communications layer) discussed herein.

Connected and autonomous vehicles may, in some embodiments, be simulated and modeled by various platforms, including by using VISSIM. Connected and autonomous vehicle behaviors may be simulated, for example, by modifying several of the variables used in a standard car-following algorithm to approximate connected and automated—rather than human—driving. Vehicle models may be implemented with adjustable parameters, including desired headway time, safety distance, following variation, temporary lack of attention, and the number of observed vehicles factored into decision-making. CV-based queue warning applications may be developed, in some embodiments, using an Application Program Interface (API) built into VISSIM, or by using any other suitable platform with or without an API.

The connectivity that comes along with CV technology may facilitate vehicle-to-vehicle (V2V) and vehicle-to-infrastructure (V2I) communication through DSRC and/or cellular channels that may be simulated by a communication layer of the simulation platform. Therefore, a cyber-attack on CV technology may imply an attack on these communication platforms and the resulting data exchange. To simulate this, the communication media may be disrupted and/or data being exchanged through the communication media may be intercepted and modified in real-time to mimic a cyber-attack.

Simulating cyber-attacks on CV-enabled transportation networks may, in some embodiments, be enabled by enhancements to a VISSIM-based simulation or other transportation simulation that is capable of simulating two communication media (e.g., DSRC and cellular) but offering opportunity to extend its functionality to model the other, and that is capable of modeling CV-enabled applications and producing corresponding vehicular trajectories useful for estimating changes in a transportation system.

In some embodiments, off-the-shelf VISSM software may be modified and enhanced to be configured to perform the tasks involved in simulating cyber-attacks in a CV environment. In some embodiments, modifying an off-the-shelf software (e.g., as opposed to developing an entirely new tool) may reduce development cost by leveraging capabilities of existing simulation software tools (with additional enhancements), and it may reduce or eliminates the problem of extensive validation and credibility issues associated with newly developed products.

In some embodiments, a CV-enabled transportation simulation layer may be created from scratch using the .NET Framework and the C# programming language, and/or any one or more other or alternative frameworks and languages, without the use of off-the-shelf software. In some embodiments, a CV-enabled transportation simulation layer may be created in part by using an emulator for creating data representing the messages from connected vehicles that are used to communicate with other vehicles on the roadway, and to communicate with infrastructure for safety and mobility instruction. In some embodiments, data representing these messages may be generated, processed, transmitted, and/or received by a transportation layer and/or a communication layer of a simulation platform, in order to simulate message transmittal by CV systems.

In some embodiments, a transportation layer simulation may be created on the basis of data including information such as, but not limited to, transportation volume, links, nodes, edges, numbers or lanes, speed limits, traffic signals, rules of various roads, etc. This information may be used to create a representation of any given element in the transportation layer, which may be assigned an element ID, and various characteristics represented by a variable that may govern how the element interacts with the rest of the environment both inside and outside the layer. This process may also be applied to other layers, to create corresponding variables representing elements in other layers based on known characteristics and behavior of those infrastructure elements.

In some embodiments, creating the plurality of geographic simulation layers comprises developing and creating a communication layer. In some embodiments, the communication layer may be configured to simulate communication infrastructure. The communication layer may be configured to receive input data to simulate effects on communication infrastructure caused by weather, cyber-attacks, and/or the electrical layer. The communication layer may be configured to generate and transmit data to simulate effects on the transportation layer (e.g., on communication systems of connected vehicles) and/or the electrical layer caused by the communication layer.

In some embodiments, developing and creating a communication layer may comprise developing and creating a communication layer that simulates telecommunications infrastructure, such as land-line telephones, mobile phones, mobile phone towers, wired network communications infrastructure, wireless network communication infrastructure, and satellite telecommunications infrastructure. In some embodiments, robust simulation of telecommunications infrastructure may be important because the telecommunications sector may provide an enabling function across many other critical infrastructure sectors. For example, the telecommunications sector may be closely linked to several sectors with lifeline functions such as energy, transportation, and water. Beyond these lifeline functions, the increasing prevalence of Internet of Things (IoT) sensors have resulted in the telecommunications sector being even more vital.

In some embodiments, developing and creating a communication layer may comprise configuring the communications layer to account for significant technological changes the telecommunications sector is experiencing. For example, some telecommunications services are nearing their end of life (e.g., copper and Time Division Multiplexing-based services), resulting in transformation to technologies such as IP and Ethernet. Use of wireless devices is reducing the use of some wireline services. Accordingly, topology data for access networks is not always available, and is in flux, which may require approximating missing data and/or simulating and projecting trends in changing data when creating the communications layer.

Furthermore, there may be performance differences between the various types of access technologies. For example, in wireline technologies, an admitted session may be allocated a fixed bandwidth circuit and receives a predictable Quality of Service once admitted; however, wireless technologies may have varying radio environments and performance. The changing landscape of this critical sector, as well as the cascading impacts of disruptions in one sector on other critical sectors, may result in even greater demand for robust modeling of this sector, wherein communications layers of simulation platforms may be configured to simulate subtle and complex performance differences like the one discussed above.

To capture the various technologies used today to provide connectivity to other critical infrastructure networks, a hybrid analytic-simulation model for the telecommunications sector may incorporate both wireless and wireline infrastructure. Dependencies between these assets and those of the other infrastructure in the simulation platform may be configured on the basis of real-world data about the inter-relations of geographically close and geographically remote infrastructure elements. The model may evaluate the impact of both physical damage scenarios and cyber-attack scenarios on the survivability and performance of the telecommunications network, as well as the impact on the other infrastructures.

The modeling approach may comprise the steps of developing a representative network topology for modeling, developing baseline communications traffic assumptions, developing a wireless access area simulation model, developing cyber-attack and physical damage scenarios, and executing the models to conduct analysis and test mitigations.

In some embodiments, developing a representative network topology for modeling may comprise incorporating both wireline and wireless telecommunications infrastructure assets into the model, including infrastructure assets providing telecommunications services to service points for the general public and also for other critical infrastructures. Cellular communications may be required for many of the CV applications used in the transportation layer discussed above. For the wireless portion of the communications layer, information from U.S. cellular infrastructure databases (e.g., available commercially and through the Federal Communications Commission (FCC)) may be used to obtain cell tower locations throughout the United States for incorporation into the model. For wireline communications, a representative Fiber to the Premises access topology may be developed, consisting of Optical Line Terminals (OLT) aggregating customers into a Regional Broadband Network, which may then connect to the internet. Wireline access may be used at many critical infrastructure service delivery points. Using publically available data as a start point, a representative internet backbone network topology for major service providers may also be developed and incorporated into the model. The integrated telecommunications network topology may then be visualized using a framework such as a SpatialOS framework.

In some embodiments, baseline communications traffic assumptions may reflect a mix of critical infrastructure voice, video, and data traffic from each of the primary infrastructure service points, along with public traffic. Inter-arrival and holding time distributions may be based on historical data. Minimum cost traffic routing through the network may be assumed, allowing for re-routing if alternate paths are required.

In some embodiments, developing a wireless access area simulation model may comprise using wireless topology and traffic emanating from cellular service points. In some embodiments, telecommunications network congestion is most likely to occur in access areas. Radio frequency conditions may be modeled to result in accurate estimates of coverage and throughput in these access areas, both in the initial transient phase when an event occurs and in steady-state conditions.

In some embodiments, developing cyber-attack and physical damage scenarios and executing models to conduct analysis and test mitigations may comprise using the hybrid simulation and analytic model to analyze the impact of a range of cyber-attack and physical failure scenarios to the various interdependent infrastructures.

Both types of scenarios may result in highly congested networks as the result of overloaded originating traffic or resulting from unavailable network nodes or links. Network survivability across all critical infrastructures may be examined. Results may differ considerably based on network topology, with scale-free networks showing a higher sensitivity to directed attacks. Thus, the model may enable analysis of design changes and other mitigations, whereby connectivity between the telecommunications network and other infrastructures may be augmented to relieve bottlenecks. Priority schemes for key infrastructure traffic over general public traffic may also be analyzed and implemented in the model.

In some embodiments, creating the plurality of geographic simulation layers comprises developing and creating an electrical layer. In some embodiments, the electrical layer may be configured to simulate electrical infrastructure, such as an electrical grid. The electrical layer may be configured to receive input data to simulate effects on electrical infrastructure caused by weather, cyber-attacks, and/or other layers of the simulation platform. The electrical layer may be configured to generate and transmit data to simulate effects on the transportation layer (e.g., on power to street lights and electric vehicle charging stations) and/or the communication layer (e.g., on power to cell towers, servers, etc.) caused by the electrical layer.

In some embodiments, the electrical layer may be developed and created in part based on electrical substation data, such as data that may be obtained from the state or local governments. The data may be associated with latitude and longitude information for various electrical substations and other electrical infrastructure elements, which may be used to link the electrical layer to elements in the other layers, such as by using a SpatialOS framework.

Electrical outages may be caused by extreme weather events, physical decay of electrical infrastructure (e.g., a tree falling on wiring, wear from squirrels or birds or other animals), designed physical takeout (e.g., cutting cords, firing guns on substations), and cyber-attacks (e.g., diverting electricity to overload a central system). In some embodiments, the simulation may be configured to simulate any one or more of the events or types of events described above by generating a statistical probability of electrical outages based on the likelihood of their occurrences. These outages may then link to other layers of the simulation platform, which may cause a cascade effect on the network.

Duration and area of effect of disruptions may also be generated determined in accordance with data sent to and received from the other layers. For example, a small storm that slows down traffic may also have a minimal effect of the electrical system, possibly causing a few downed trees to cut power to local neighborhoods. However, a larger ice storm that halts traffic over a wide area may have a chance of taking out an entire power substation, leaving regions without cellular towers and traffic lights.

As discussed in further detail below, a cyber-attack may be configured in the simulation to take out locations strategically, attempting to take out the most valuable targets while remaining unnoticed. Information gleaned from simulating and analyzing cyber-attacks and weather-caused outages may allow users to gain valuable information that may be used to determine if a real-world outage is attributable to a cyber-attack or to natural causes.

At block 206 of FIG. 2, in some embodiments, the system may associate elements in each of the plurality of simulation layers with elements in the other simulation layers, based on geographic metadata associated with each of the elements. The system may build a multi-layer simulation by linking the layers together with one another such that elements and actions from one layer may affect elements and actions in other layers. In order to do this, each layer may be configured such that elements in the layer may generate output data configured to affect elements in other layers, wherein inter-layer elements having similar geographic metadata affect one another, as shown at block 208. Similarly, each layer may be configured such that elements in each layer accept input data from other layers configured to affect elements in the receiving layer, wherein inter-layer elements having similar geographic metadata affect one another, as shown in block 210.

Thus, geographic metadata may be used to create causal links between elements in different layers, wherein elements that are nearby one another may be assumed to affect one another and elements that are remote from one another may be assumed not to affect one another. For example, radio towers in the communication layer may be assumed to be powered by the power station in the electrical layer that is geographically closest among all power stations in the electrical layer. As another example, CV's in the transportation layer may be assumed communicate with navigation software via the cell tower in the communications layer that is geographically closest among all cell towers in the communications layer.

To create interdependencies between different layers, the system may initially create a baseline framework for how the layers interact based on assumptions that take into account the nature of the infrastructure represented by each layer as well as the geospatial information (e.g., latitude, longitude, altitude) associated with elements represented in each layer. In the simplest of systems, elements in each layer may be assumed to be interconnected with elements in other layers that have similar geospatial information, and they may be assumed not to be interconnected (or to be interconnected in a different manner) with elements in other layers that have dissimilar geospatial information. For example, elements within a threshold geographic distance of one another may be assumed to be connected with one another, while elements outside a threshold geographic distance of one another may be assumed not to be connected with one another. Thus, a power station in an electric layer may be assumed to provide power to all towers in a communication station within 10 miles of the power station, but not to towers not within 10 miles of the power station. Baseline assumptions incorporating geographic information may thus be used to create associations that interrelate data from one layer with data from another, such that each layer may be configured to process received data and to generate output data in accordance with the assumptions incorporating geographic information.

Figure 4:
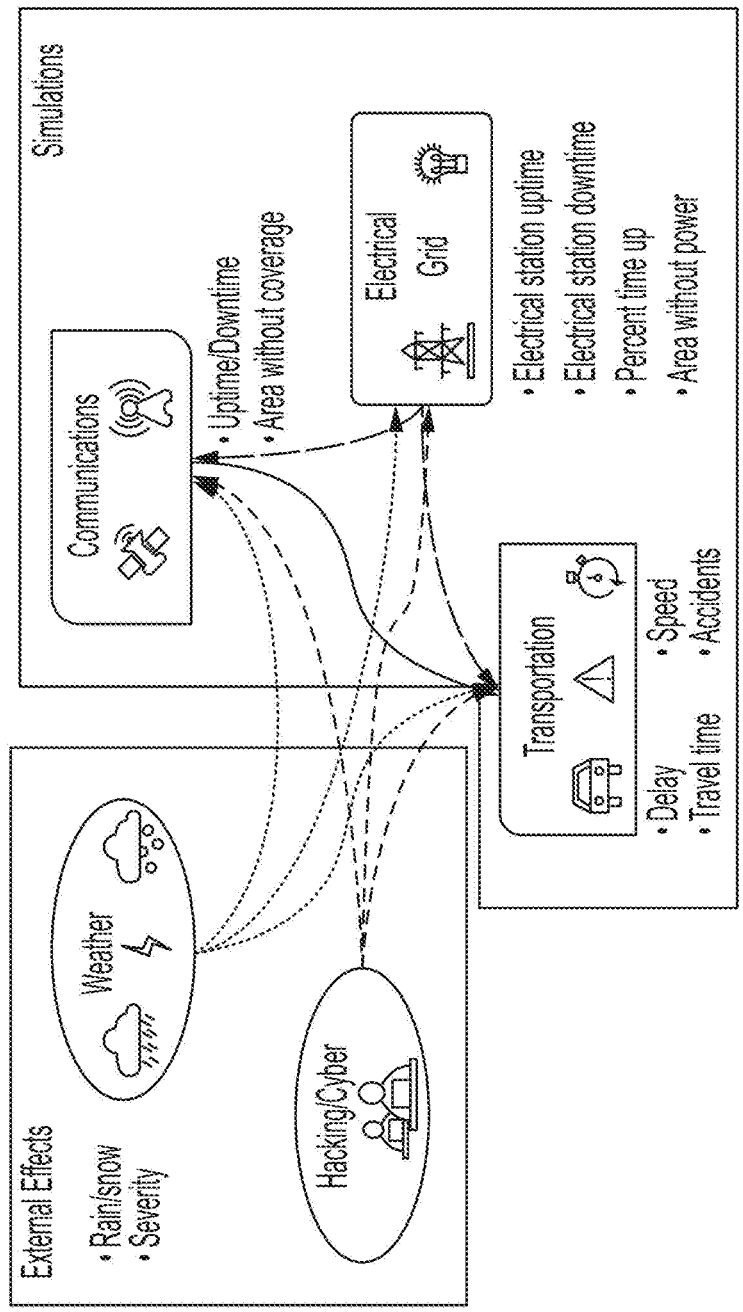
FIG. 4 depicts exemplary interactions of simulation layers and outside influences, in accordance with some embodiments.

FIG. 4 depicts exemplary baseline interactions of three simulation layers (communications, electrical, and transportation), in addition to two outside influences (weather and hacking/cyber-attacks), in accordance with some embodiments. As shown by the arrows linking the three simulation layers, the baseline assumption may include configuring the layers such that data output by the electrical layer may affect both the communications layer (e.g., cell towers, radio towers, internet servers, etc.) and the transportation layer (e.g., stop lights, gas station pumps, electric vehicle charging stations, etc.); data output by the communication layer may affect the transportation layer (e.g., electronic vehicle navigation) but not the electrical layer; and data output by the transportation layer may affect neither the communications layer nor the electrical layer.

Assumptions and configurations regarding linkages between layers may be informed by and refined based on real-world information about the infrastructure elements being simulated. For example, a transportation system may have a particular intersection that affects miles of roadway in the event that it loses power, or a single radio tower may provide service to a disproportionately high number of roadside units. These realities may be accounted for in configuring the layers to generate output data and accept input data to be sent between the different layers in the simulation.

As shown by the arrows stemming from the two outside influences in FIG. 4, data associated with either weather events or hacking/cyber events may affect any one or more of the three layers shown. As discussed above, these assumptions and configurations may also be informed and refined based on specific real-world information about the particular city or other environment being simulated.

Assumptions and linkages between layer such as those discussed above may be modified by the system and/or by a user of the system in accordance with additional information about known infrastructure characteristics of the real-world environment being simulated, but geographic metadata associated with simulated infrastructure elements may in this way provide baseline assumptions for interlinking the plurality of layers to create a multi-layer simulation.

In some embodiments, any one or more of the simulation layers and software instances discussed herein may be brought together in the multi-layer integrated model. In some embodiments, elements in each layer may generate output data to be sent to other layers, and may accept input data transmitted from other layers. The data transmitted between layers may comprise geographic data (e.g., latitude, longitude, altitude) that may be used to determine what elements in other layers are affected, and in what way those elements are affected. In some embodiments, data may be configured to only affect elements within a certain threshold distance of its associated geographic data, or to affect closer elements more severely and to affect more distant elements less severely.

In some embodiments, the integrated environment may be generated using geographic based simulation software, or it may be generated using any one or more suitable programming languages and may be configured to be run via one or more multi-core .NET servers and to accept inputs from one or more client devices including Windows computers, Mac computers, iOS phones or mobile devices, Android phones or mobile devices, and/or Windows phones or mobile devices. In some embodiments, geographic-based simulation software may allow for each simulation layer (e.g., transportation, electric, and communication) to link to a centralized server for parameter inputs and outputs. In some embodiments, geographic-based simulation software may be a cloud-based computational platform that allows the use of one or more servers (or virtual machines) to power a single simulation. In this way, all simulation layers may be run at the same time, with each layer affecting each other layer, despite not running on the same machine. The platform may also allow for a large number of agents across multiple layers, since those agents can be distributed across multiple servers.

In some embodiments, the server(s) running each layer may be selected and/or configured in accordance with the computational intensity of running the particular layer of the simulation. For example, while a fairly powerful server may be needed to run a transportation simulation with tens of thousands of agents (or more) in real time, an electrical grid simulation may have far fewer entities and may be able to run concurrently with less power than the transportation simulation. Thus, a more powerful server may be selected to run the transportation layer, while a less powerful (and less expensive) server may be used to run the electrical layer. By distributing computational loads across multiple servers (e.g., using a different set of one or more servers per layer of the simulation), the scale of large systems may no longer be dependent on super-computing capabilities. Instead, different resources may be allocated to different simulations with their interactions handled by the back-end service, which may vastly improve computational efficiency and speed of the simulation.

In some embodiments, the infrastructure of the simulation may be configured and managed by the geographic based simulation software. Each simulation layer may point to a centralized entity that may manage interactions among agents in the system. The integrated simulation platform may be able to run the transportation layer on one server and the communication layer on another, but, for example, when a vehicle needs to receive a message from a radio tower, that geographical proximity (spatially) based information may be sent between the two layers. Agents in one model may thus impact agents from another based on their characteristics, such as based on signal strength of a radio tower or based on vehicle trajectory of a vehicle.

In some embodiments, the simulation may be integrated with an engine for generating, rendering, and outputting three-dimensional (3D) graphics and animations, such as a gaming engine such as the Unity3D gaming engine. This may allow the system to create 3D visualizations of test cases. In some embodiments, each individual layer may be rendered, and the interactions between layers may be displayed as actual visual events. In some embodiments, rendered visualization of an event may allow a user to perceive the event more accurately, in more detail, and in a manner in which more meaningful information is readily apparent.

At block 212 of FIG. 2, in some embodiments, the system may execute the multi-layer simulation using associated elements in each of the plurality of simulation layers. That is, once various associations between elements in different simulation layers have been established such that data may be sent between layers and affect the status and behavior of elements and agents in various layers, the multi-layer simulation may be executed on the basis of these associations. In some embodiments, the system may run in accordance with a propagation algorithm that seeks equilibrium states for one or more systems represented in or by layers. In some embodiments, the simulation may be run for a predetermined amount of real-world time (e.g., for a predetermined number of minutes or hours or days of processing time), or the simulation may be run for a predetermined amount of simulated time (e.g., for a predetermined number of simulated hours, days, weeks, or years). In some embodiments, the simulation may be run until such time that the system determines that one or more layers has reached an equilibrium state, that all layers have reached an equilibrium state, or that one or more layers are determined to be unlikely to reach an equilibrium state (e.g., the simulation may time out if no equilibrium state is achieved).

In some embodiments, the multi-layer simulation may be executed on the basis of the baseline assumptions and inter-layer linkages discussed above. Thus, by running the simulation, the system and/or a user of the system may be able to observe whether the behavior and/or characteristics of one or more layers changes as compared to when the simulation was run without being linked to any other layers. In some embodiments, changes of characteristics and/or behaviors of elements or agents within certain predefined thresholds may be considered acceptable, while changes in excess of those predefined thresholds may be considered unacceptable and may indicate that associations and linkages between the layers do not accurately represent the real-world environment corresponding to the simulation.

At block 214, in some embodiments, the system may adjust associations of elements and/or may adjust characteristics of elements of the layers based on additional information beside the initially received geographic metadata. For example, the system may adjust element characteristics and/or element associations by changing data representing one or more elements in one or more layers, and/or by creating new association between inter-layer elements, dissociating currently-linked inter-layer elements, and/or adjusting the nature and/or intensity of an association between inter-layer elements (for example, a sector of the transportation sector may be configured to receive only some electricity from a given power station of the electrical layer, rather being configured to receive all electricity from the given power station). In some embodiments, the elements and/or associations between them may be adjusted based on observation of the execution of the multi-layer simulation at block 212.

At block 216, in some embodiments, the system may adjust associations and/or element characteristics on the basis of comparing the simulated characteristics of the layers (e.g., from the executed simulation at block 212) against corresponding real-world characteristics of the real-world environment being simulated. If the multi-layer simulation deviated unacceptably from single-layer simulation performance and/or from known, real-world characteristics of the simulated environment, then the system may determine that adjustments to the elements and/or associations may be required.

Adjusting element characteristics and/or element associations on the basis of by comparing the simulated characteristics of the layers against corresponding real-world characteristics of the real-world environment being simulated may be an important aspect of developing a multi-layer model that accurately and meaningfully represents the real-world environment. After each of the layers are run, with each individual layer's inputs coming from the other layers, one or more adjustments on the basis of such a comparison may be performed to make sure the results of the simulation can still align reasonably with the baseline non-integrated model. That is, such adjustments may ensure that integrating different layers with one another does not cause one or more layers to deviate unacceptably from the characteristics of the one or more layers before integration, nor to deviate unacceptably from the characteristics of the real-world environment represented by the simulation.

Take, for instance, the case of a transportation model of Seattle, as discussed above. A 29-mile stretch of road that is being simulated in Seattle I-405 may have a real-world average travel time of 40 minutes. If, after the integration of the electrical and communication layers, the travel time increases unrealistically (e.g., to greater than a predefined threshold time above the real-world travel time, such as by more than 10 minutes, or by more than 20 minutes), the interaction between the layers need to be tweaked to ensure that it is performing realistically. In some embodiments, such adjustments may ensure that the integrated model can still perform each of the individual simulations adequately before the integrated model can be tested to specific test cases.

Alternately or additionally, at block 218, the system may adjust associations by updating layers (including updating one or more characteristics of one or more elements therein) to incorporate newly received, updated data associated with any one or more of the plurality of infrastructure sectors of real-world environment being represented. Thus, the system may be configured to receive periodic (e.g., every 5 minutes, every 15 minutes, every hour, every day, every week, etc.) and/or real-time updates about one or more infrastructure sectors, and may adjust associations between elements (and/or adjust characteristics of the elements themselves) based on the newly updated information. For example, if the system receives information that a new cell tower has been constructed, then the system may modify the communications layer to newly represent the new cell tower, and may adjust linkages between the communications layer and other layers to reroute cell traffic to account for the presence of the new tower. In this way, the simulation may incorporate newly-received information to continuously update itself to represent the most up-to-date characteristics and behaviors of the real-world environment being simulated.

It should be noted that, in some embodiments, the simulation itself may refresh at a faster rate than new data is provided to the simulation. For example, while new data may be received by the system on a periodic basis every minute, several minutes, hour, day, etc., the refresh rate of a layer of the simulation or of the entire multi-layer simulation may be on the order of hours, minutes, or seconds, and therefore may be faster than the rate at which new data is received. Accordingly, the simulation may undergo several updates based on propagation of user inputs to the system before any new outside data is received by the system.

Following blocks 214-218, method 200 may revert to block 212 and execute the multi-layer simulation using the updated associations and/or updated elements represented by the plurality of layers, and/or 200 may revert to block 204 and recreate/adjust layers of the simulation and/or characteristics of elements of the layers, and execute the multi-layer simulation using the updated associations and/or updated elements represented by the plurality of layers. Thus, blocks 204-218 and/or 212-218 may be iteratively performed any suitable number of times in order to continue to improve and optimize the multi-layer simulation for the most accurate and up-to-date representation of the real-world environment being simulated.

Figure 5:
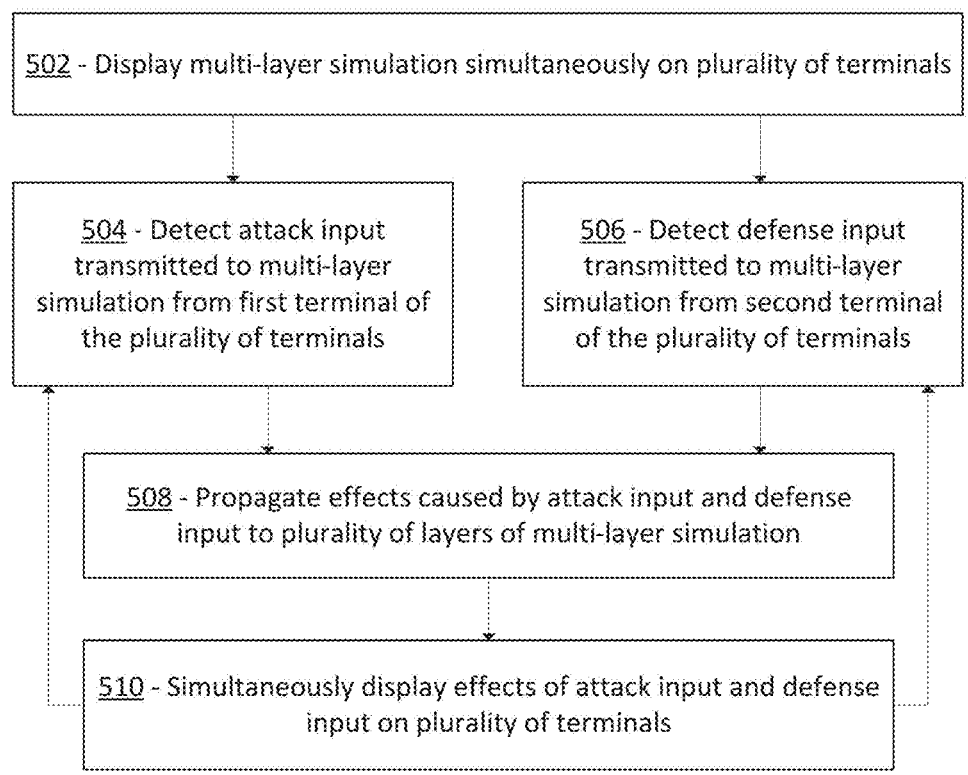
FIG. 5 is a flowchart depicting a method for executing an attack/defense simulation using a multi-layer simulation, in accordance with some embodiments.

FIG. 5 is a flowchart depicting a method 500 for executing an attack/defense simulation using a multi-layer simulation, in accordance with some embodiments. In some embodiments, the method 500 may be performed by a system such as system 100, as discussed above in FIG. 1. In some embodiments, as discussed below, the attack/defense simulation may be a multi-user simulation in which users at separate terminals may execute inputs against the same simulation, wherein one user may be attempting to destabilize the simulated environment (e.g., attack) and wherein the other user may be attempting to stabilize the simulated environment (e.g., defense).

At block 502, the system may display a multi-layer simulation simultaneously on a plurality of terminals. The plurality of terminals each may be any suitable computing device, such as one comprising a display and an input device (e.g., keyboard, mouse, etc.) In the example of FIG. 1, the plurality of terminals may comprise terminals 106 and 108. In some embodiments, the plurality of terminals may comprise two terminals, while, in some embodiments, the plurality of terminals may comprise more than two terminals. Each terminal may be individually configured (or configured as part of a group of multiple terminals) to be able to display all or part of the simulation, and/or, in some instances, to be able to execute control inputs to be transmitted to the simulation platform and to be processed by the simulation platform to affect the simulated environment.

The system may display the multi-layer simulation simultaneously on the plurality of terminals by transmitting data from one or more central simulation platform servers to one or more of the terminals representing information about the simulation, a representation of the simulation, and/or a rendering of the simulation. The transmitted data may be updated iteratively (e.g., on a turn-by-turn basis) or continuously.

In some embodiments, the system may be configured such that multiple terminals may display the same representation, rendering, and/or information about multi-layer simulation at the same time. In some embodiments, the system may be configured such that different terminals may simultaneously display different representations, renderings, and/or information about simulation at the same time. For example, users of different terminals may control the areas and layers of simulation that are displayed on their terminal such that the users at different terminals may simultaneously observe different layers and/or different geographical areas of simulation at the same time.

In some embodiments, terminals among the plurality of terminals may be configured to serve different roles in the system. A terminal may be configured as an attack terminal, where a user of the terminal may be enabled to execute inputs configured to destabilize the simulated environment (e.g., take down a power station, destroy a bridge, etc.). A terminal may be configured as a defense terminal, where a user of the terminal may be enabled to execute inputs configured to stabilize the simulated environment (e.g., repair a power station, re-route power away from a damaged station, re-route traffic away from a damaged bridge, deploy emergency services, etc.). A terminal may be configured as an administrator terminal, where a user may be configured to execute attack inputs, defense inputs, and/or administrator inputs controlling non-attack and non-defense characteristics of the environment, such as weather events. A terminal may be configured as an observer terminal, where a user may be permitted to observe the simulated environment and the effects of inputs from other terminals, but where the user may not be permitted to execute inputs against the simulated environment.

In some embodiments, attack terminals and defense terminals may be configured to be able to display the same information, representation, and/or renderings of the simulated environment, while, in some embodiments, attack terminals and defense terminals may be configured to be able to display different information, representation, and/or renderings of the simulated environment. For example, in some embodiments, attack terminals may be configured to be able to view a limited amount of information about a simulated environment, while defense terminals may be configured to be able to view a greater amount of information about the simulated environment; in this way, the system may place a user of an attack terminal in the role of a nefarious actor (e.g., hacker, etc.) with limited access to information about infrastructure, while the system may place a user of a defense terminal in the role of an official actor (e.g., infrastructure sector worker, network administrator, military personnel, etc.). The information available to users of each terminal may be tailored to a specific simulated role for the user of the terminal (e.g., hacker, terrorist, infrastructure sector worker, network administrator, military personnel, etc.), and may furthermore be modified in accordance with actions executed against the simulation itself. For example, if an attack-role user is successful at disrupting communications services to a particular facility, then a defense-role user in the role of a worker at that facility may have information and/or controls hampered or disabled.

At block 504, the system may detect an attack input transmitted to multi-layer simulation from the first terminal of the plurality of terminals. In some embodiments, the attack input may comprise an input instructing the system to transmit data to the simulation platform to cause one or more simulated infrastructure elements of the simulation to be disrupted, destabilized, or otherwise compromised. For example, an attack input may cause one or more simulated infrastructure elements to cease functioning at full capacity, to cease functioning entirely, and/or to function in an alternate manner. For example, an attack input may cause a simulated power station to be disabled, may cause a simulated traffic light to switch to always-green, and/or may cause a simulated communications tower to fail to relay some or all communications traffic.

At block 506, the system may detect a defense input transmitted to multi-layer simulation from the second terminal of the plurality of terminals. In some embodiments, the defense input may share any one or more characteristics in common with the attack input discussed above, except the defense input may comprise an input instructing the system to transmit data to the simulation platform to cause one or more simulated infrastructure elements of the simulation to be repaired, mitigated, or otherwise stabilized. For example, a defense input may cause one or more simulated infrastructure elements to resume functioning and/or to function in an alternate (e.g., improved) manner. For example, a defense input may cause a simulated disabled power station to be re-enabled, may cause a simulated traffic light to resume proper functioning, and/or may cause a simulated communications tower to fail to resume proper relaying of some or all communications traffic.

In some embodiments, the attack input at block 504 and the defense input at block 506 may be detected simultaneously, one after the other, and/or during the same turn or iteration of the attack/defense simulation. In some embodiments, the system may wait to receive both inputs before continuation along in method 500. In some embodiments, a predefined amount of time or a predefined time period may be allotted for both inputs to be entered, and the system may continue with method 500 after the time period or amount of time has expired.

At block 508, the system may propagate the effects caused by the attack input and the defense input to the plurality of layers of multi-layer simulation. That is, rather than allowing the effects of the attack input and defense input to propagate only into the layer initially affected by the inputs, the system may run the multi-layer integrated simulation to allow second-order and third-order (and beyond) effects of the attack input and defense input to be realized across any and all layers of the simulation, including by simulating how the effects of the attack input and defense input may interact with one another. For example, if an attack input causes a power station in the electrical layer to be disabled, then the simulation may propagate that effect such that associated traffic lights in the transportation layer may be disabled, and such that associated cell towers in the communications layer may be disabled. The disabled traffic lights may, then, cause traffic that may slow repair times for crews attempting to reach the disabled power station, and disabled communications may slow response-times for emergency responders attempting to reach the scenes of accidents caused by the disabled traffic lights. At the same time, the effects of a defense input may be propagated and may be allowed to interact with the effects described above.

In some embodiments, the effects of attack inputs and defense inputs may propagate through the simulation following propagation of any previous attack inputs or defense inputs, rather than starting from the simulation baseline.

In some embodiments, the system may run the multi-layer simulation in accordance with the attack input and defense input for a predetermined period of real time, for a predetermined period of simulated time, until the multi-layer simulation achieves one or more equilibrium states, and/or until the multi-layer simulation determines that one or more equilibrium states may not be achieved.

At block 510, the system may simultaneously display the effects of the attack input and the defense input on the plurality of terminals. Thus, all users (whether in attack role, defense role, administrator role, and/or observer role) may observe the effects of the attack input and defense input on the multi-layer simulation. Displaying the effects of the attack input and defense input on the plurality of terminals may comprise displaying information, representations, and/or renderings of the simulated environment during and following the propagation of the attack input and defense input through the simulation.

In some embodiments, blocks 504-510 may represent a single round, turn, or iteration in a turn-based or iteration-based attack/defense simulation system. In some embodiments, attack-role users and defense-role users may take iterative, simultaneous, or rotating turns in attempt to destabilize and stabilize the simulated environment, respectively. In some embodiments, users in attack and/or defense roles may select inputs (e.g., attack inputs or defense inputs) from a menu of available actions. In some embodiments, available options may be assigned a value based on the severity or estimated real-world cost of the action. For example, disabling a single power line may be assigned a far lower value than disabling an entire power station or power plant. Each turn or iteration (or a set thereof) may then be assigned a maximum value from which a user may "spend," and users in each turn may thus be limited in the number and severity of actions that they may execute against the simulation. Following blocks 504-510, method 500 may return to blocks 504 and/or 506, which may represent a next turn or iteration in the attack/defense simulation system.

The system may iteratively execute any number of turns or iterations on a simulation, until a predefined number of turns is reached or until a predefined condition is achieved (e.g., attack successful, attack defeated, etc.). In some embodiments, between or during any one or more turns, administrator-level events such as weather events may be executed. In some embodiments, between or during any one or more turns, the simulated environment may be updated based on newly received data about the real-world environment being simulated.

In some embodiments, following execution of one or more turns and/or following execution of the attack/defense simulation method, the system may generate, transmit, and/or store one or more summaries, reports, representations, or renderings of the state of the simulated environment during and/or after the attack/defense simulation method. In some embodiments, a final metric representing the disruption of one or more agents, one or more infrastructure elements, one or more infrastructure sectors, and/or the simulated environment as a whole may be generated, transmitted, and/or stored.

In some embodiments, the system may generate, transmit, and/or store outputs indicating statuses of infrastructure elements (e.g., healthy, compromised, partially compromised), infrastructure sectors (e.g., layer healthy, layer compromised), and/or agents represented in the simulation. An agent represented in the system may represent a person in the simulated environment, and the agent in the simulation may be assigned various needs and wants for use of various infrastructure elements. If all of an agent's needs and wants are satisfied in the simulated environment, then the agent is not disrupted. However, if the agent is unable to meet one or more of his needs or wants in the simulated environment (e.g., power to the agent's home is out, the agent cannot refuel his car, the agent cannot communicate via internet), then the agent may be considered disrupted based on his unmet needs. In some embodiments, the system may generate a behavioral disruption ration, which may be the ratio of the agent's total needs/wants divided by the agent's satisfied needs/wants. Thus, a higher behavioral disruption ratio indicates a more disrupted agent. In some embodiments, different needs and wants may be weighted as more or less critical in calculating a behavioral disruption ratio. In some embodiments, the system may calculate behavioral disruption ratios for individual agents, as well as on a cumulative or average basis across geographic areas of a simulation, demographic slices of a simulation, or across an entire simulation.

In some embodiments, the multi-layer system may be able to model cyber-attacks against specific infrastructure areas, allowing users to identify how those attacks affect other infrastructure sectors. In some embodiments, cyber-attacks may be modeled in accordance with the attack/defense method 500 discussed above, while, in same embodiments, they may be modeled in a single-user and/or non-turn-based and/or non-competitive use case. Cyber-attacks comprising strategic covert interactions may be unlikely to be picked up by known modeling technology, but the integrated multi-layer system disclosed herein may allow analysis of the significant ripple effects on the rest of the system that may be caused by the malicious removal of a single entity. Thus, the system may allow for cyber-attack simulations that may allow users to identify points of vulnerability by simulating multi-attribute stressor events within the integrated multi-layer platform.

In some embodiments, each infrastructure sector may have its own cybersecurity vulnerabilities and attack vectors, and simulating attacks and exploits against them may result in observable actions reflected in the models. In some embodiments, the system may be configured such that it incorporates into the appropriate infrastructure layer the operational impacts of the latest vulnerabilities and exploits against a proposed infrastructure system.

In some embodiments, identifying the latest vulnerabilities and exploits against specific infrastructure sectors may comprise retrieving latest information from known cybersecurity vulnerability repositories for each infrastructure sector. For example, there are some vulnerability databases that may be applicable to multiple infrastructure sectors, such as the Industrial Control Systems Computer Emergency Response Team (ICS-CERT) vulnerability database and the National Vulnerability Database (NVD). Furthermore, certain vulnerability databases may be specific to a particular infrastructure sector, such as the Surface Transportation-Information Sharing and Analysis Center (ST-ISAC).

In some embodiments, analyzing these vulnerabilities (e.g., vulnerabilities in databases) may comprise identifying devices that these vulnerabilities may be used against. After identifying vulnerable devices, a range of operational impacts that could be realized against the specific infrastructure sector may be identified. As an example, if there is a new vulnerability found to effect traffic signal controllers, then the operational impact may be to place the traffic signal into a flashing red state. From there, the range of operational impacts could be placing one or two signal controllers into a flashing red state to placing all of the signal controllers in a downtown metropolitan area into a flashing red state. To identify what these operational impacts would be and the realistic range of operational impacts, information from the real-world specific infrastructure sector may be integrated into the simulation platform in association with these vulnerabilities. In addition to these attacks, known real-world examples of successful cyber-attacks against infrastructure sectors may be identified, and the simulation may be configured to replicate their operational impacts via inclusion in each infrastructure sector's layer.

Once operational impacts have been identified, they may be included in the appropriate infrastructure layer of the simulation by configuring the elements of the layer to act and respond in accordance with the known operational impacts. In some embodiments, a user of the simulation may then be able to select an operational impact (e.g., putting traffic signals into a flashing red state) and select a range of the operational impact (e.g., the number and location of the traffic signals in the flashing red state). Once simulation cyber-attacks have been incorporated into a specific infrastructure sector layer, then the system may be able to run the simulation and determine what corollary effects occur in both that sector and in other infrastructure sectors. As cyber-attack simulations are added to more infrastructure sectors, the system may simulate simultaneous attacks against multiple infrastructure sectors to model the combined effects across all sectors and how those effects differ from an attack against a single infrastructure sector.

From these different simulations, the system may identify and generate attack signatures unique to a single attack, a group of attacks, and/or a plurality of simultaneous attacks. These attack signatures may then be output, stored, and/or transmitted, for use in real-world monitoring of infrastructure sectors to determine whether real-world operational issues are or are not indicative of a cyber-attack.

A cyber-attack may be simulated by taking offline specific high-impact locations that would have second-order effects on other environments. By hiding where these impacts are coming from, a user viewing the simulation may be unaware of whether these effects are coming from simulated natural causes like the weather, or from a simulated cyber-attack. Training on a system such as this may allow users of the simulation model to understand what a cyber-attack may look like and allow for faster responses to an actual, real-world event.

In some embodiments, the system may generate, store, and/or transmit output indicating differences in performance measures between simulated attacks and simulated non-attack events.

Figure 6A:
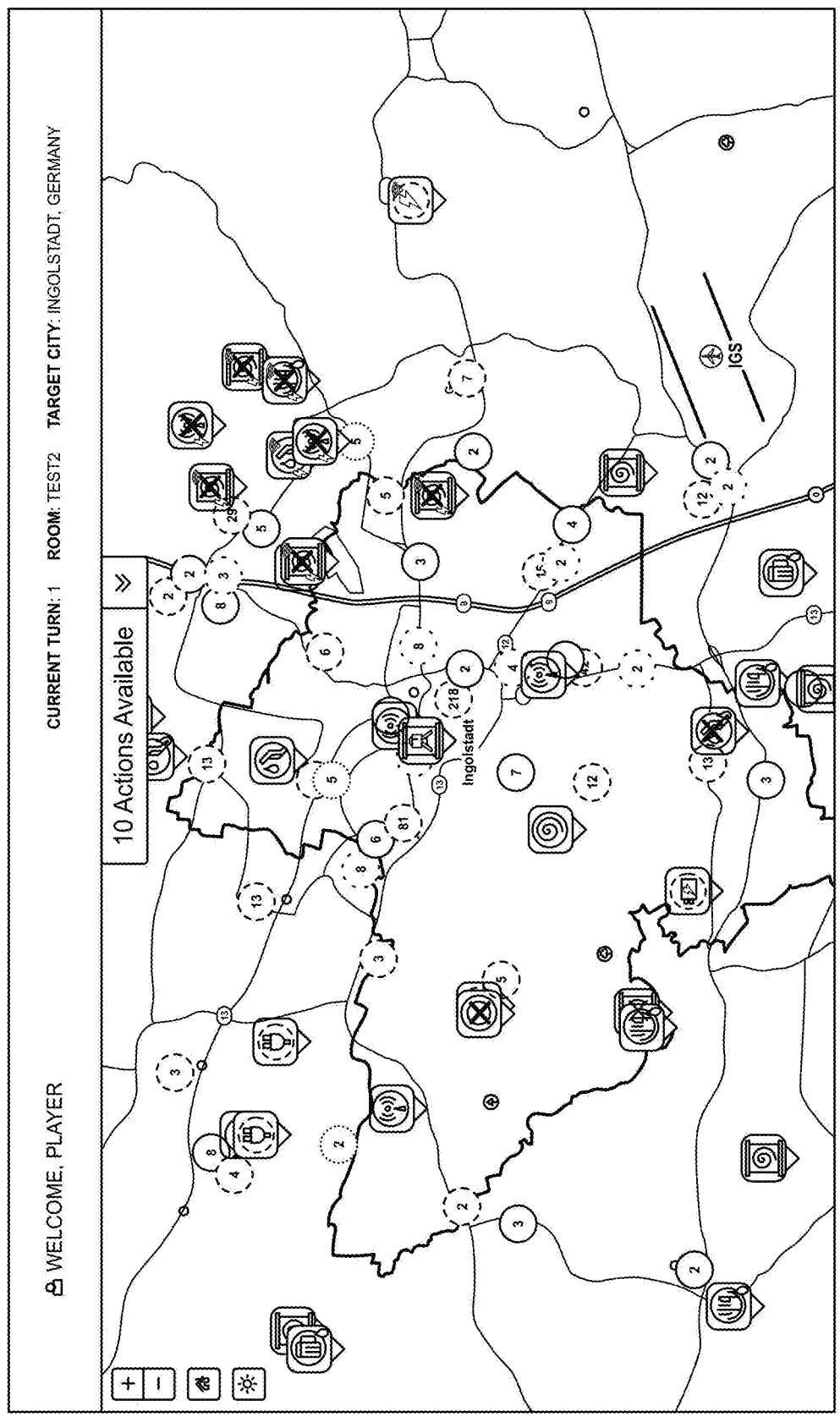
FIGS. 6A-6P depict a user interface for viewing and controlling a multi-layer simulation, in accordance with some embodiments.
Figure 6B:
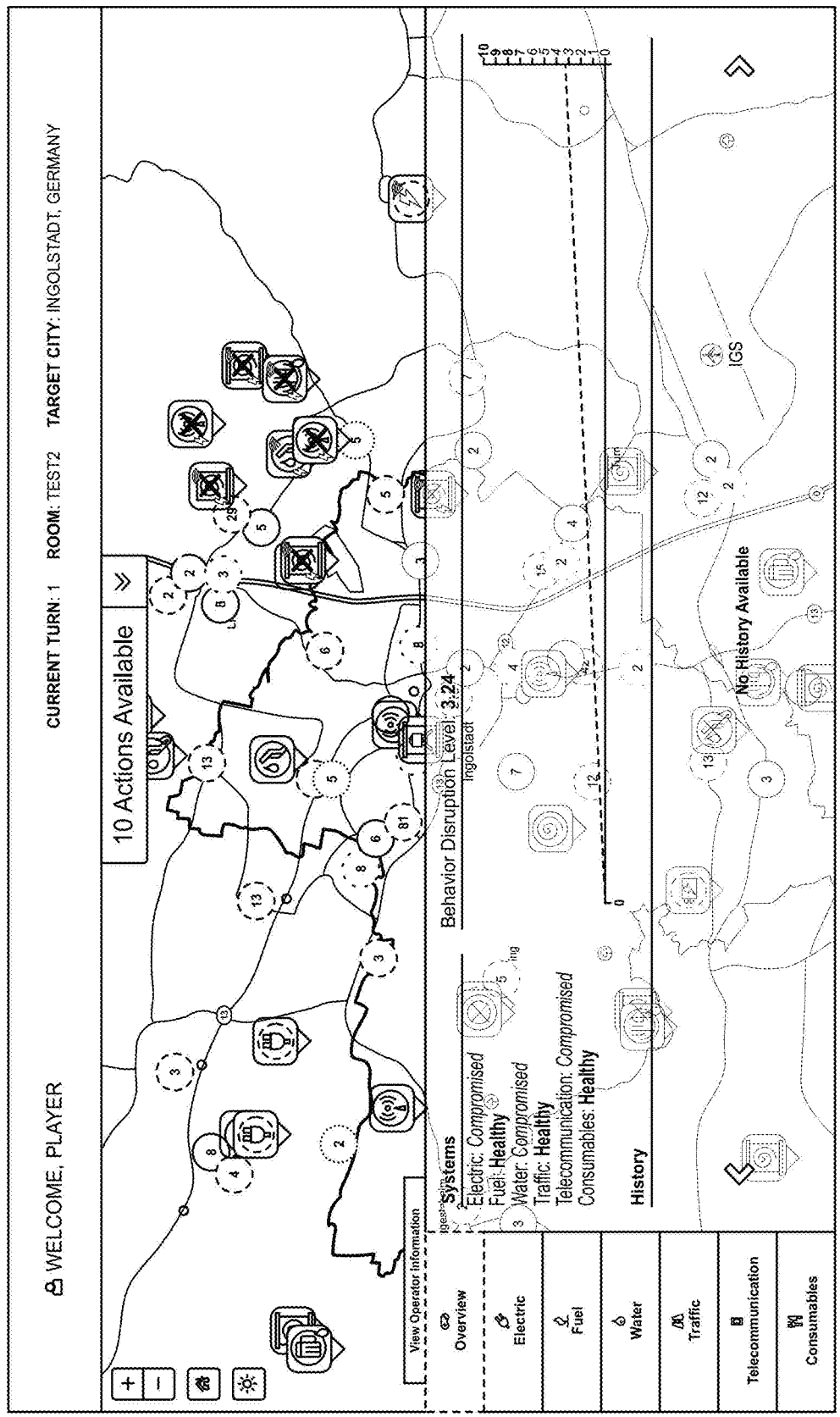
Figure 6C:
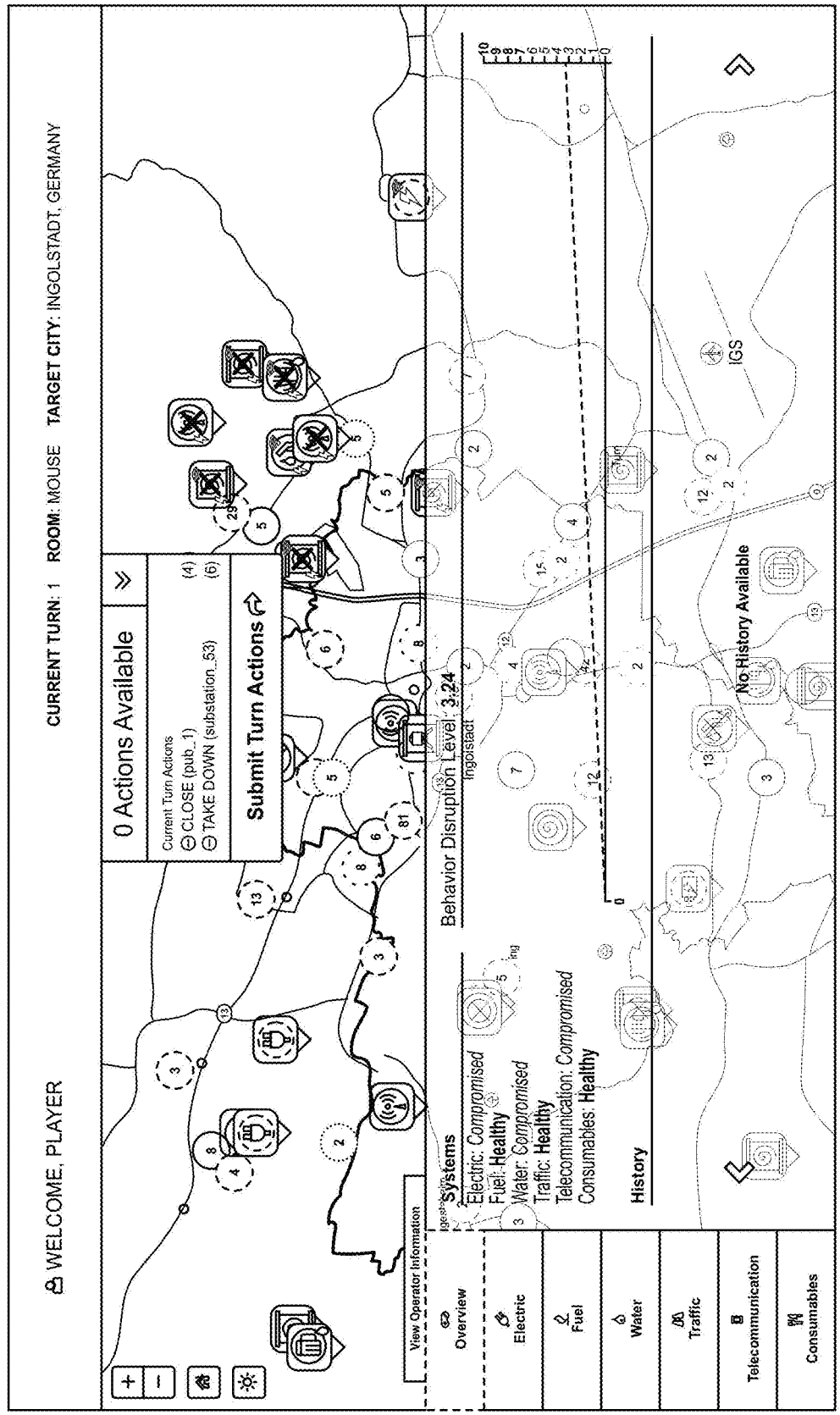
Figure 6D:
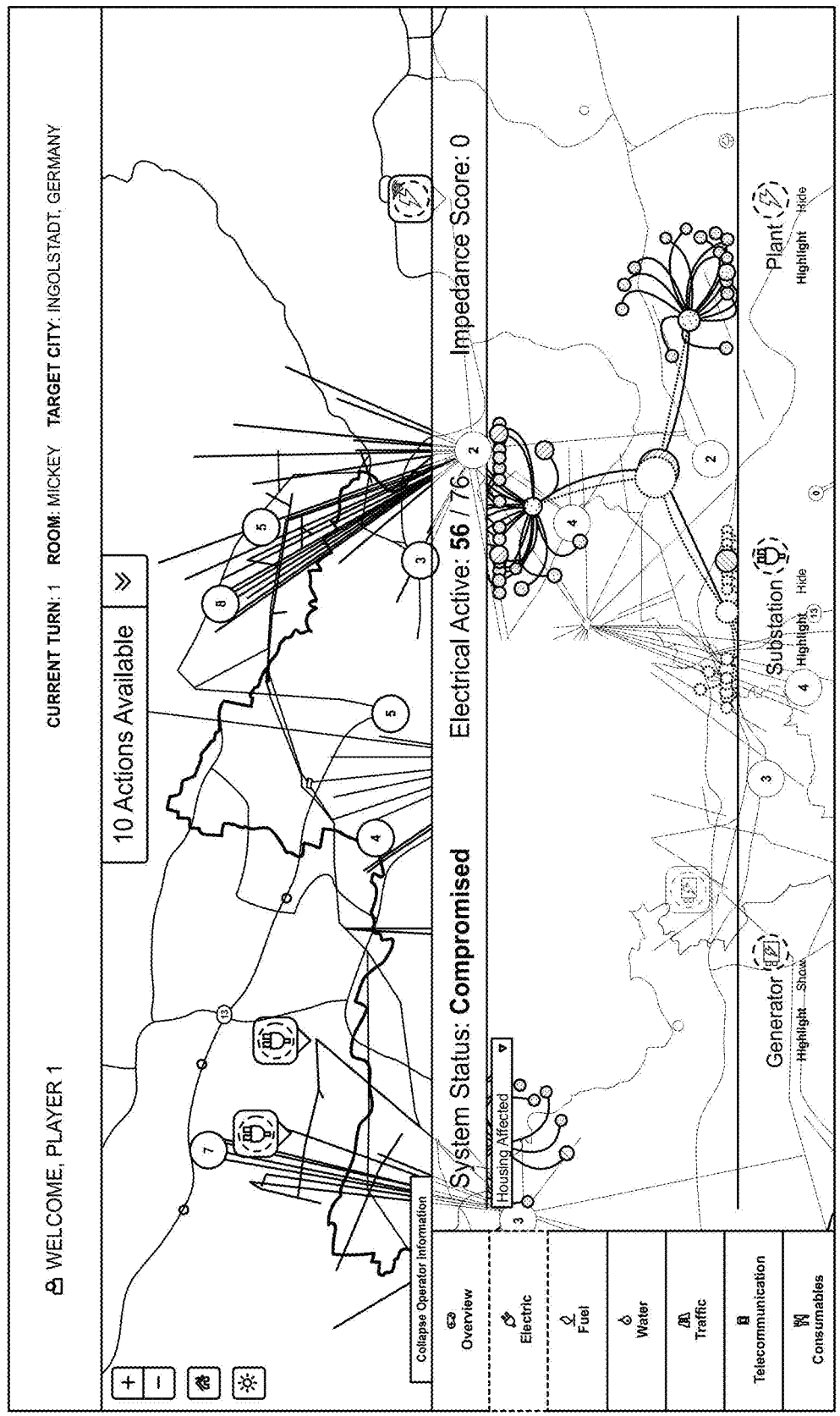
Figure 6E:
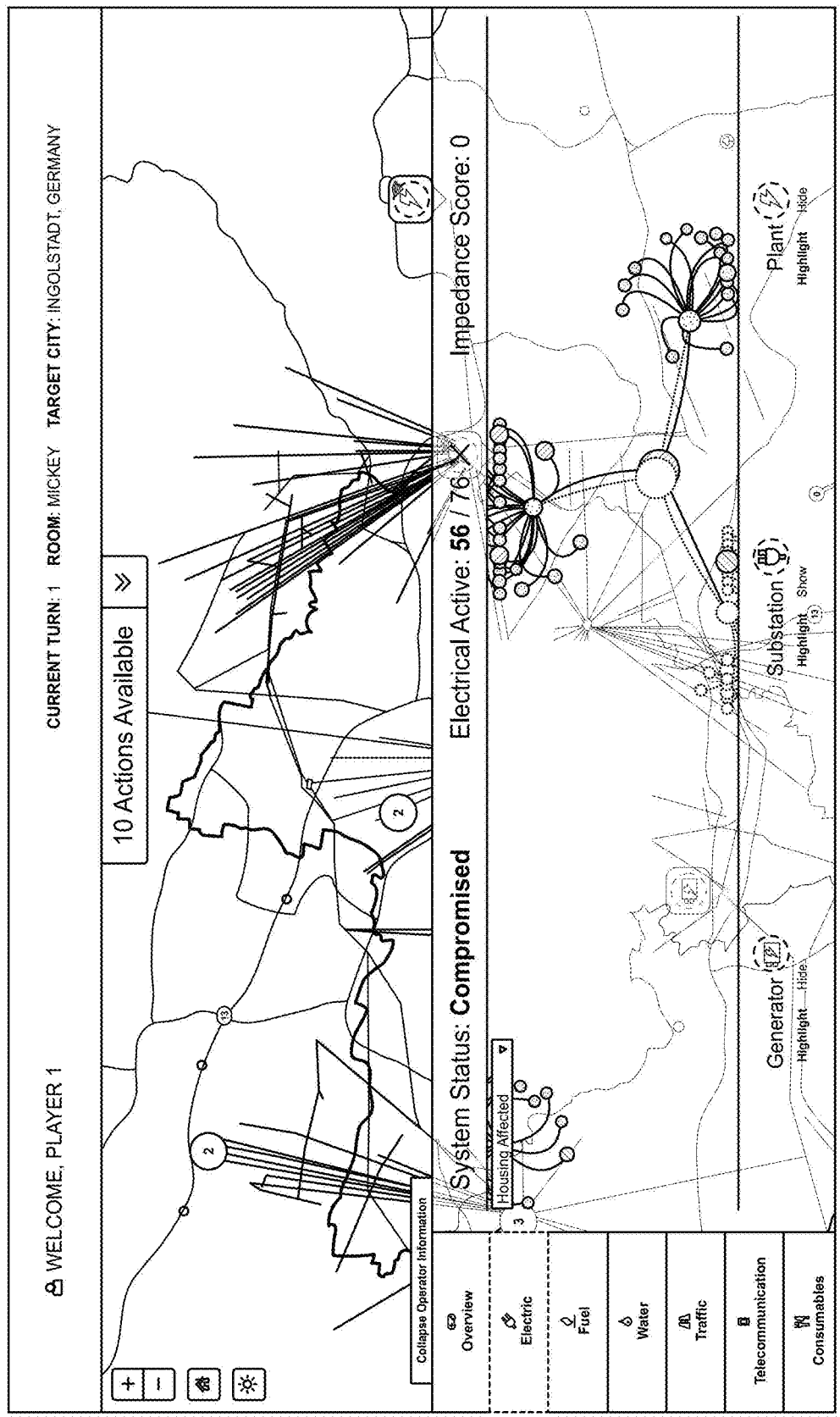
Figure 6F:
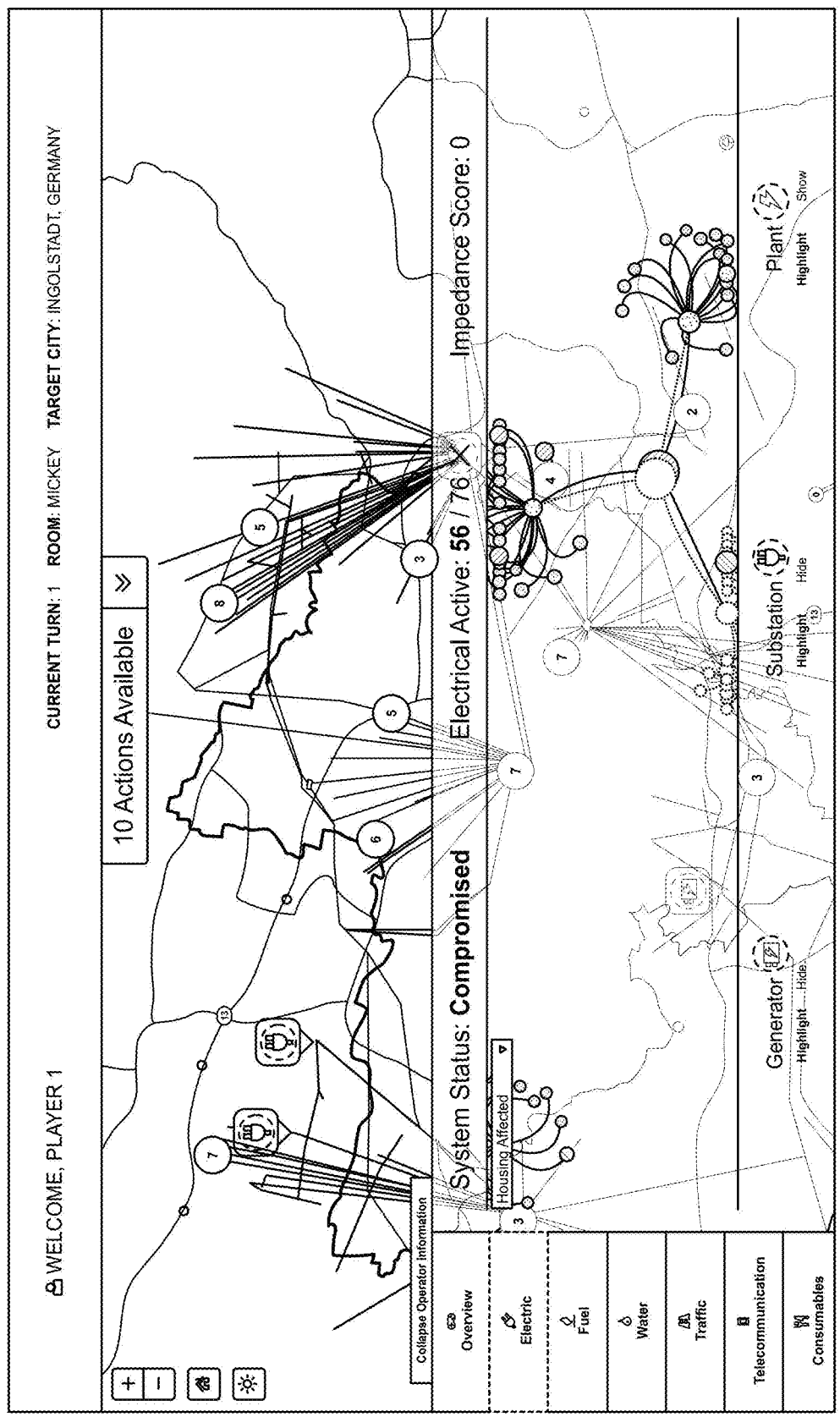
Figure 6G:
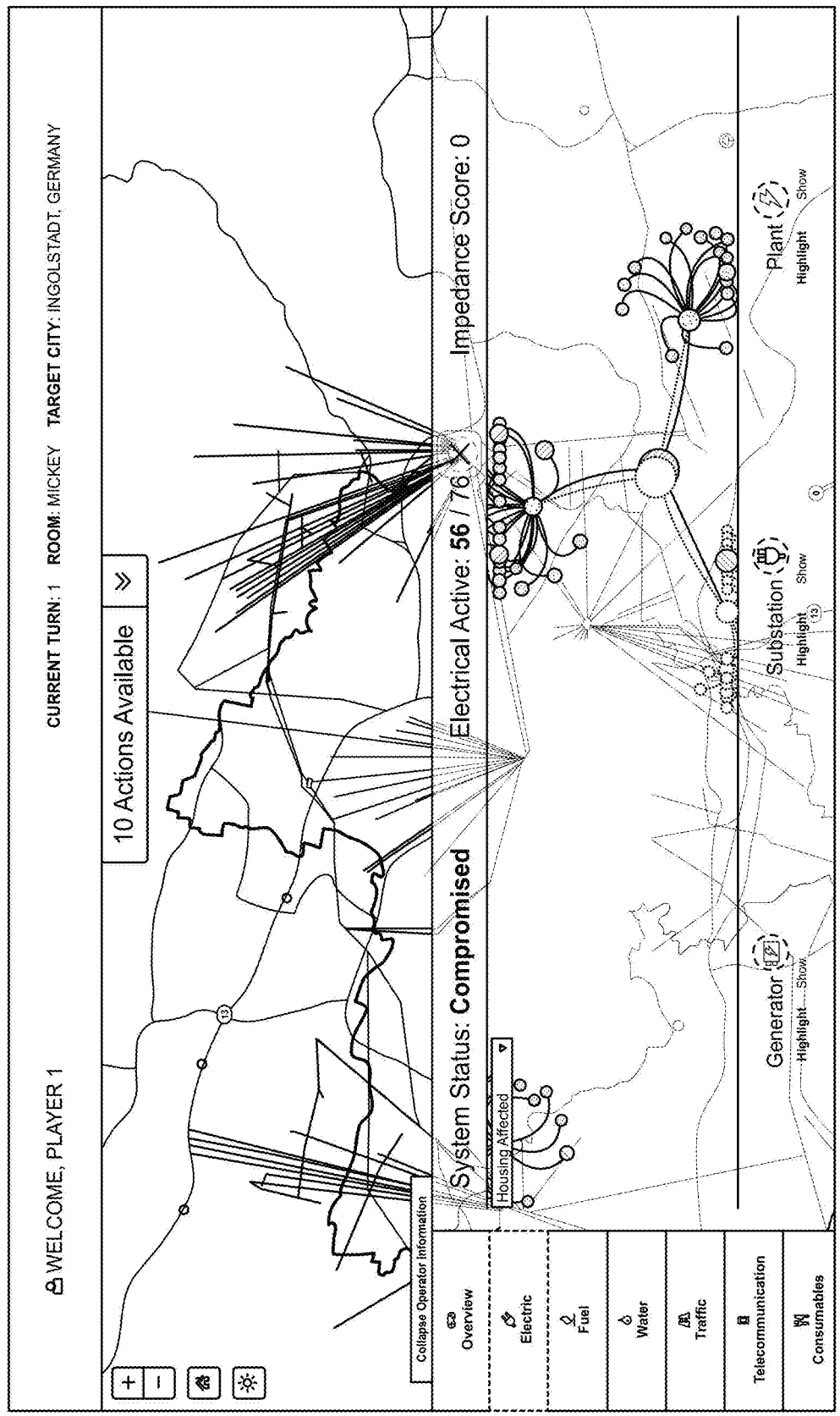
Figure 6H:
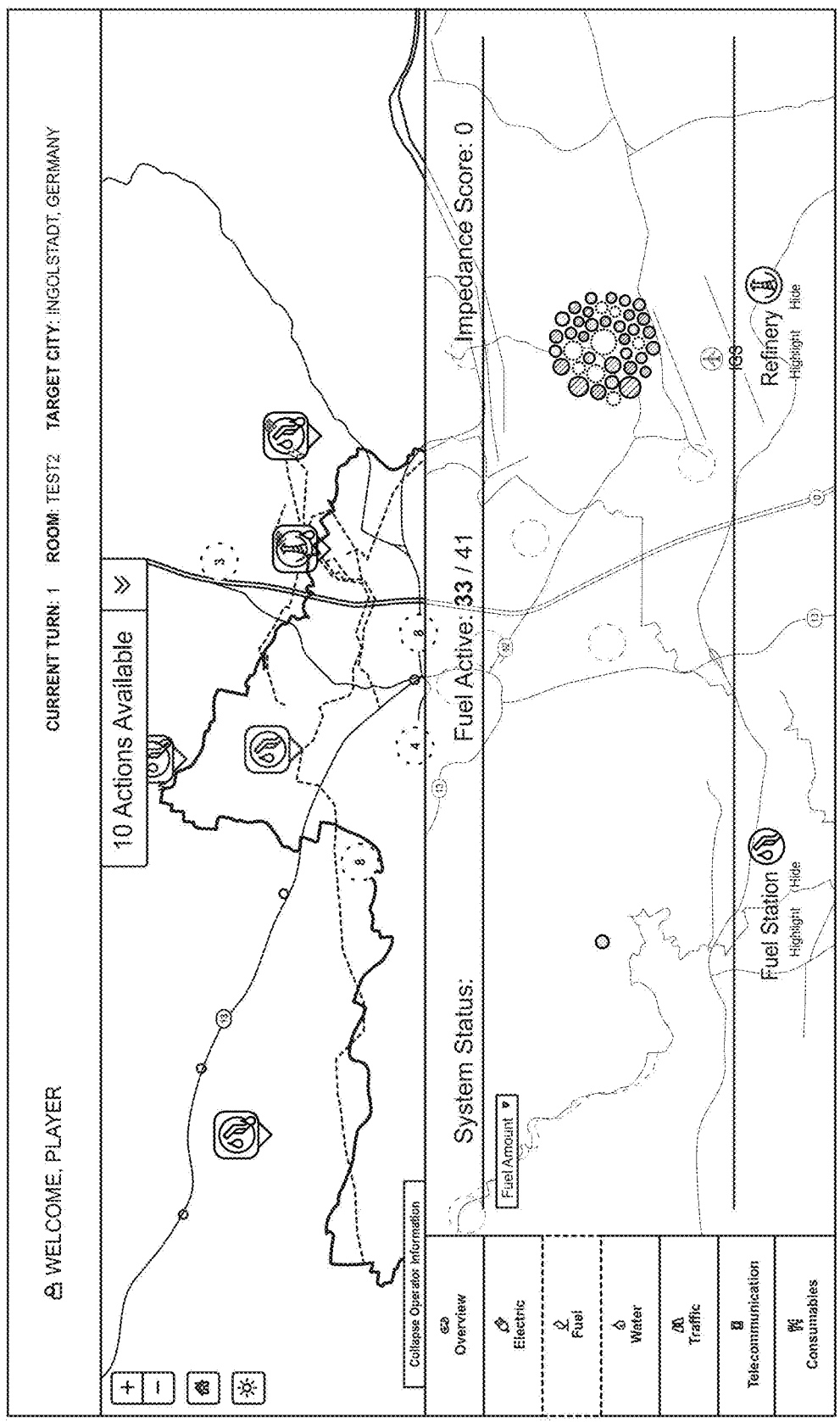
Figure 6I:
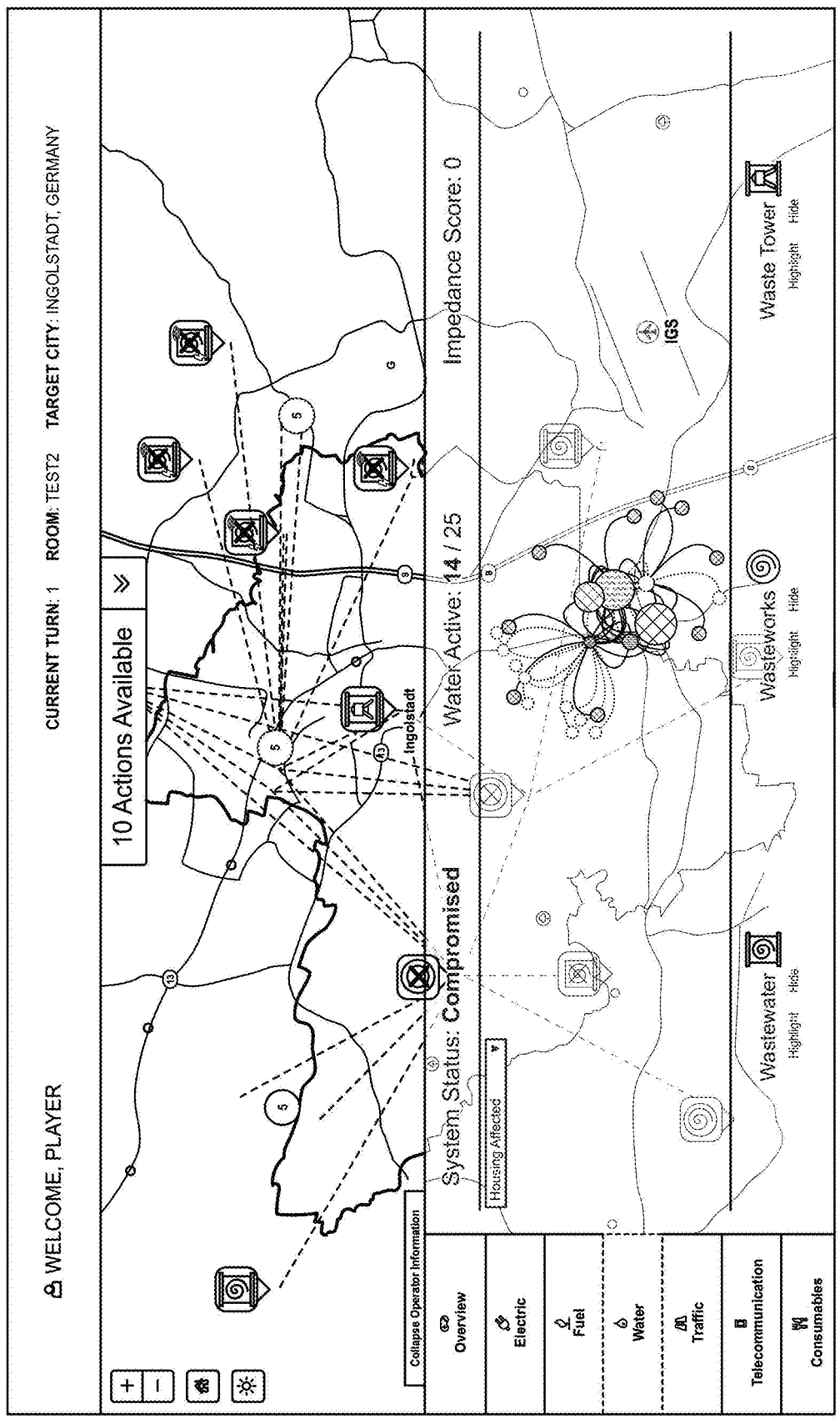
Figure 6J:
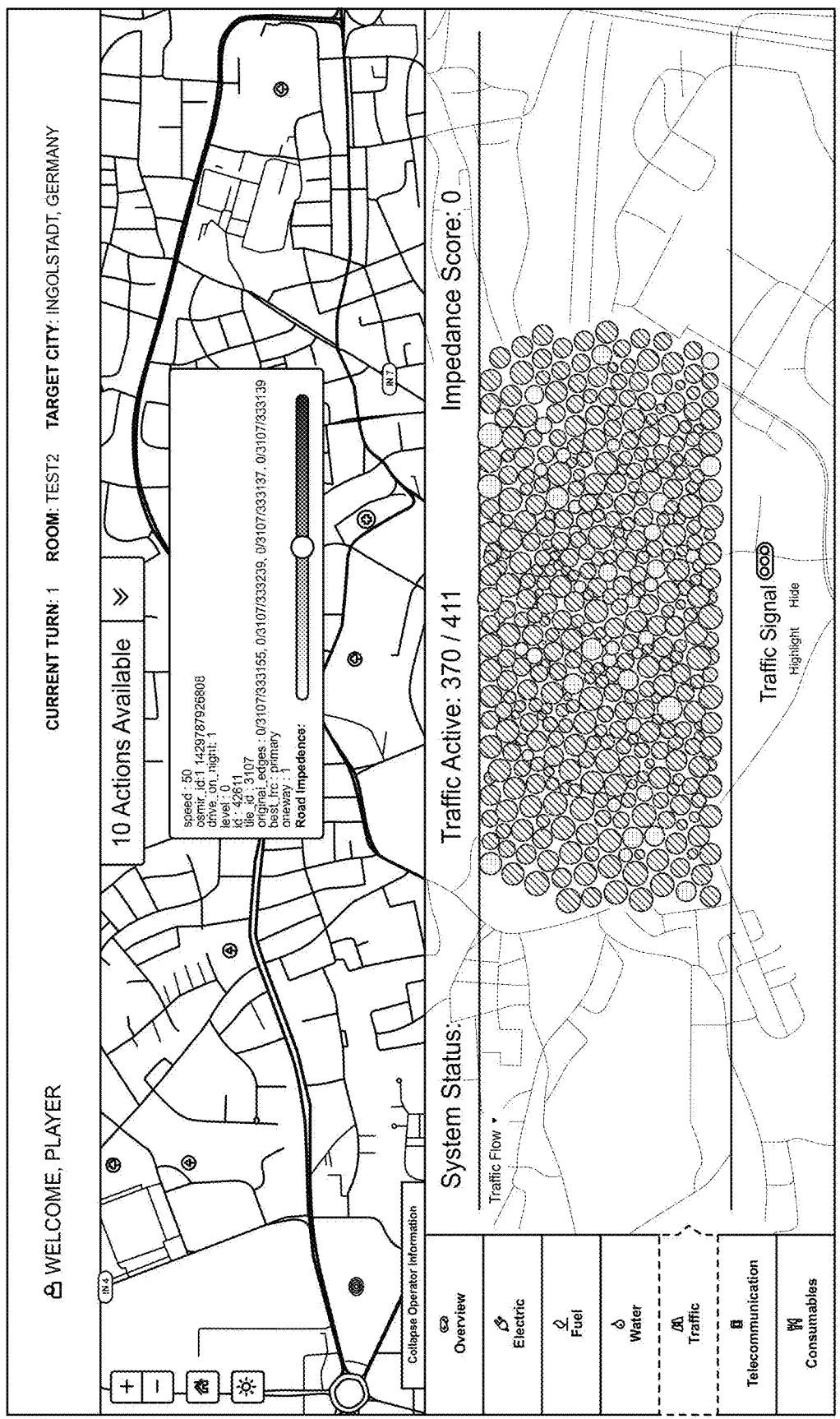
Figure 6K:
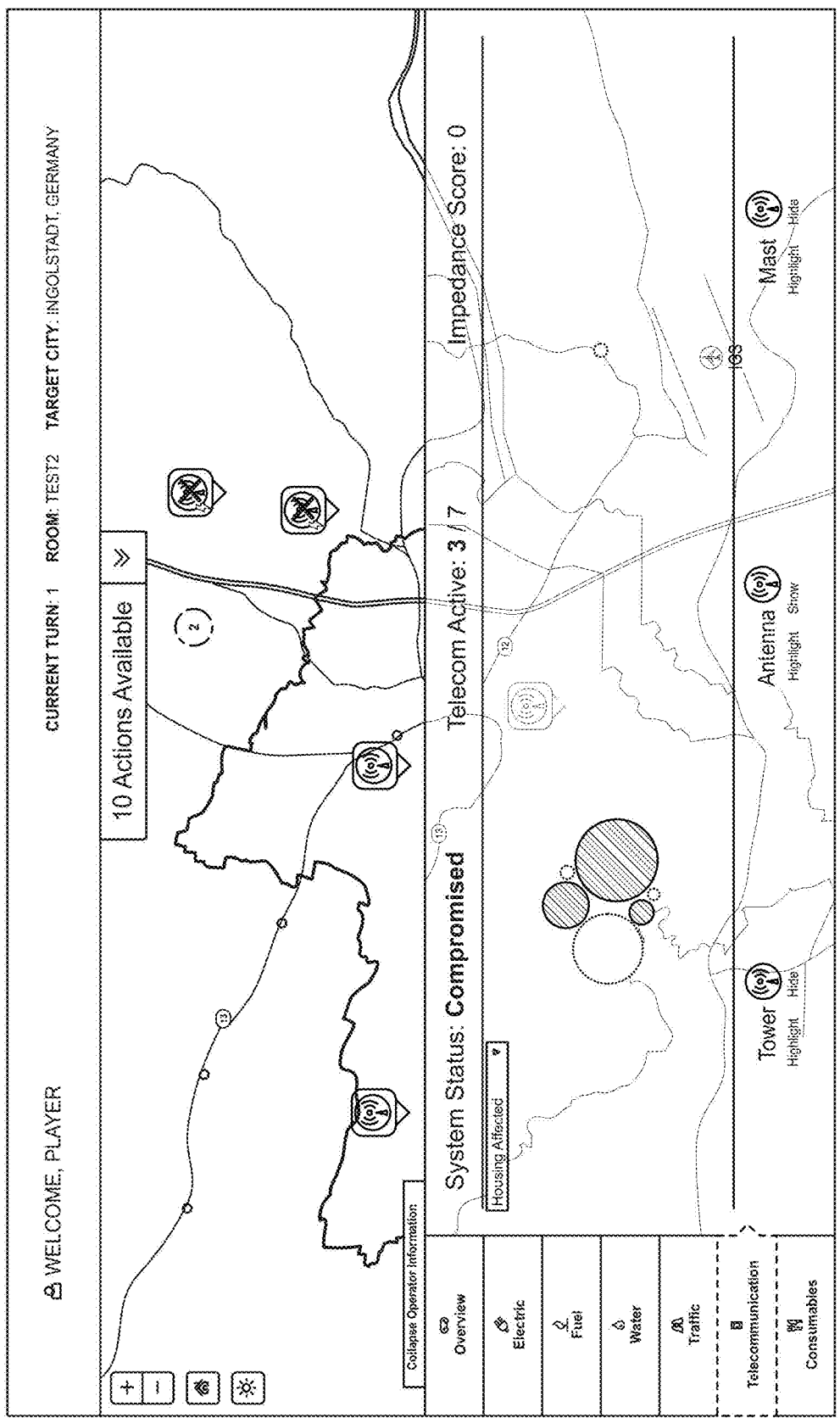
Figure 6L:
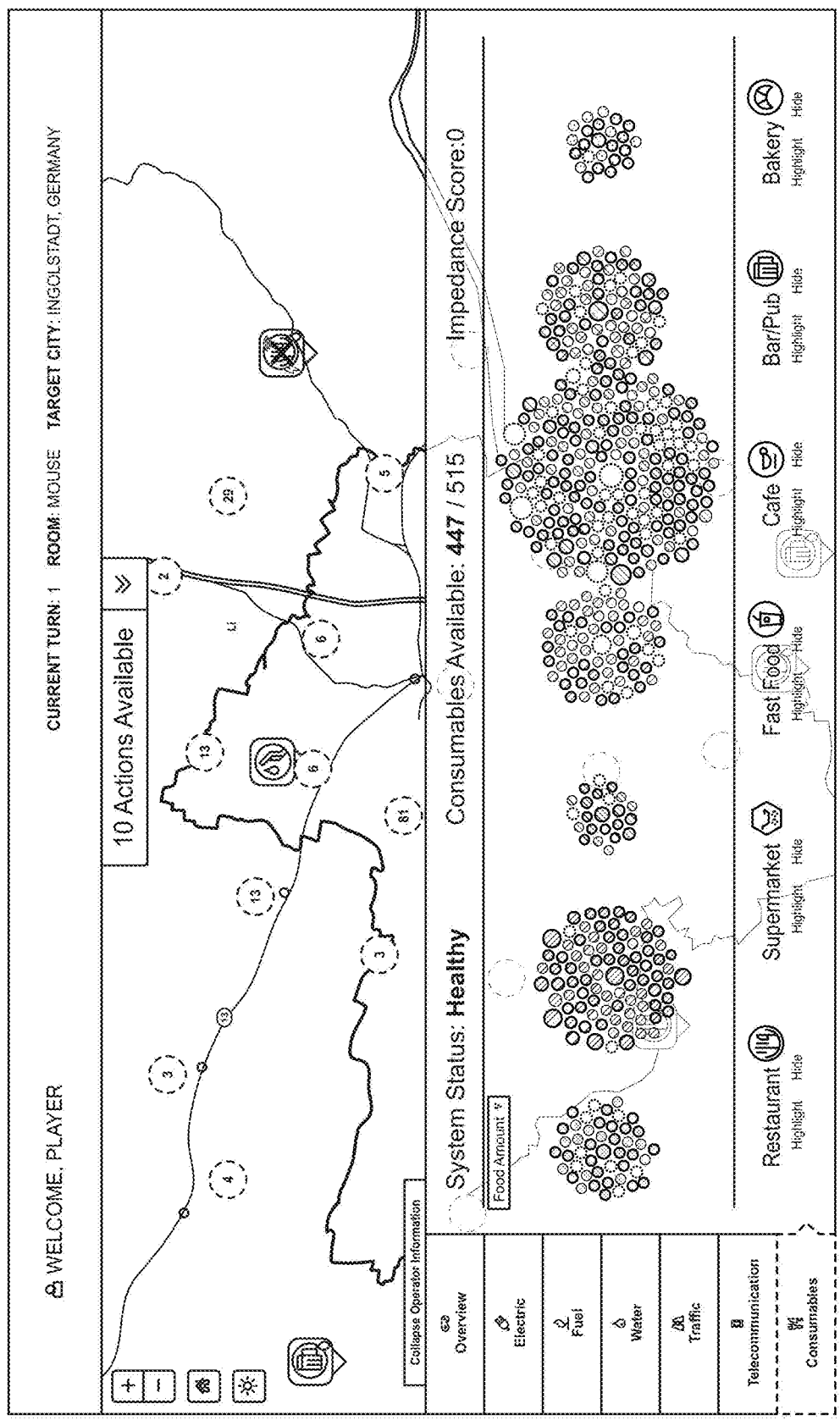
Figure 6M:
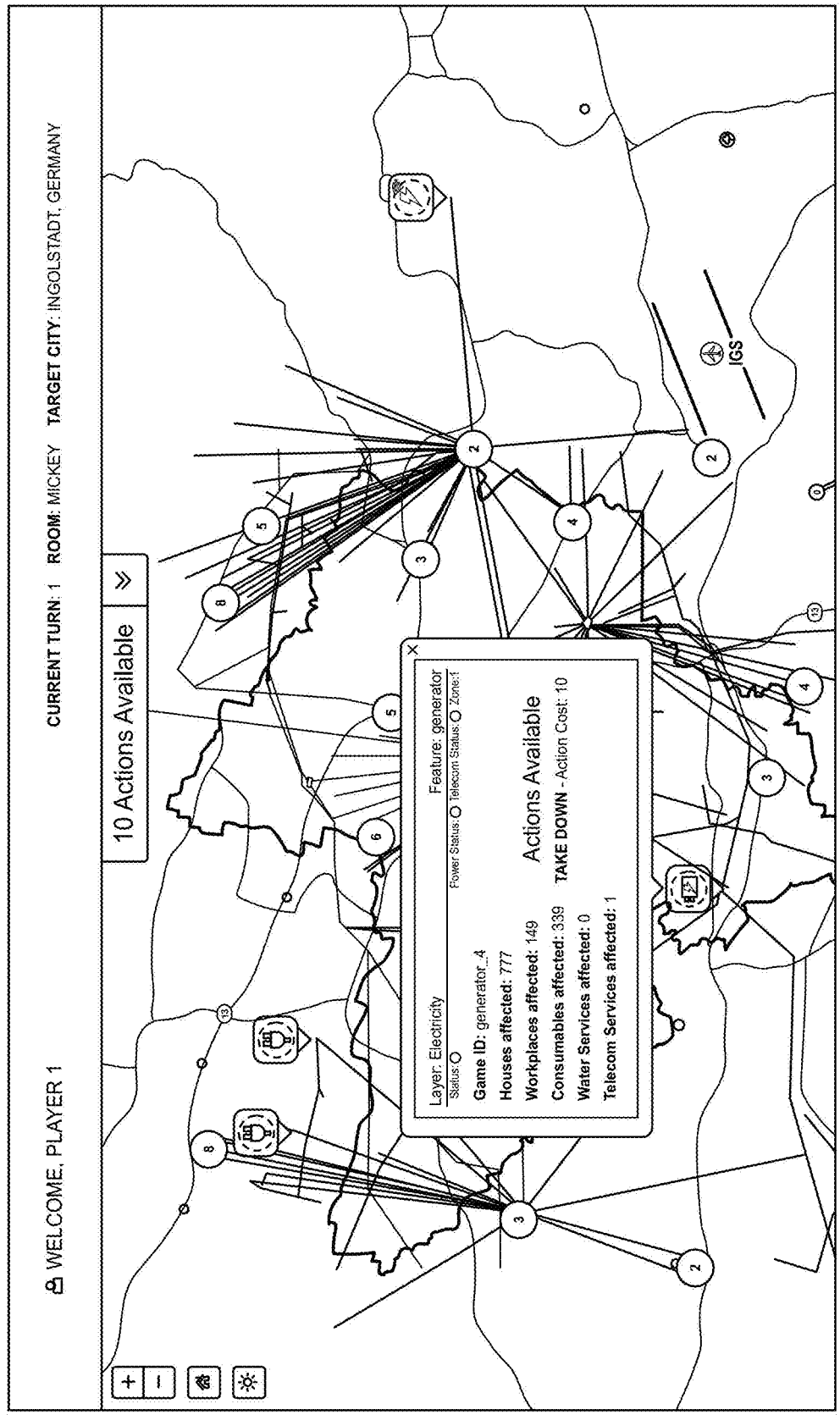
Figure 6N:
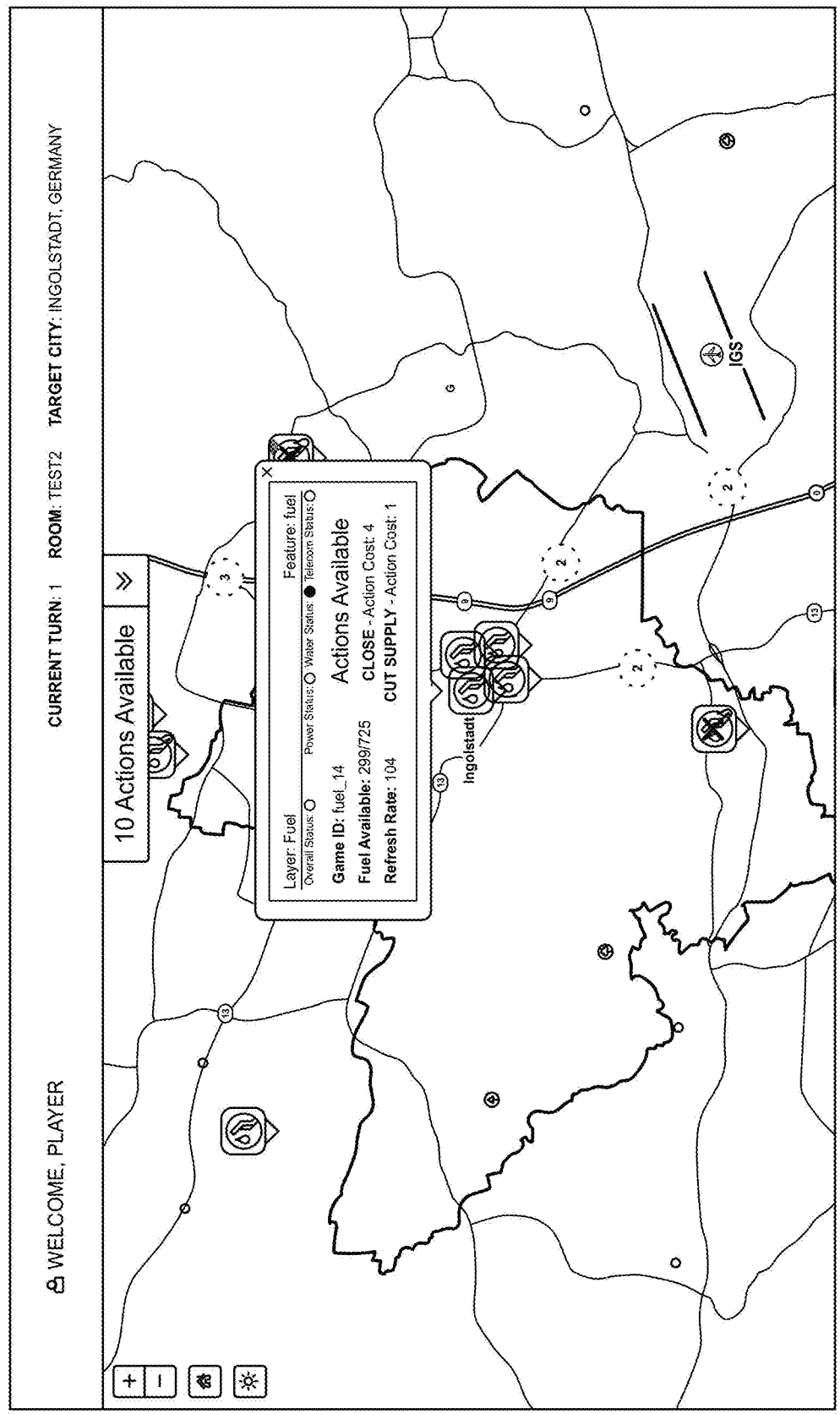
Figure 6O:
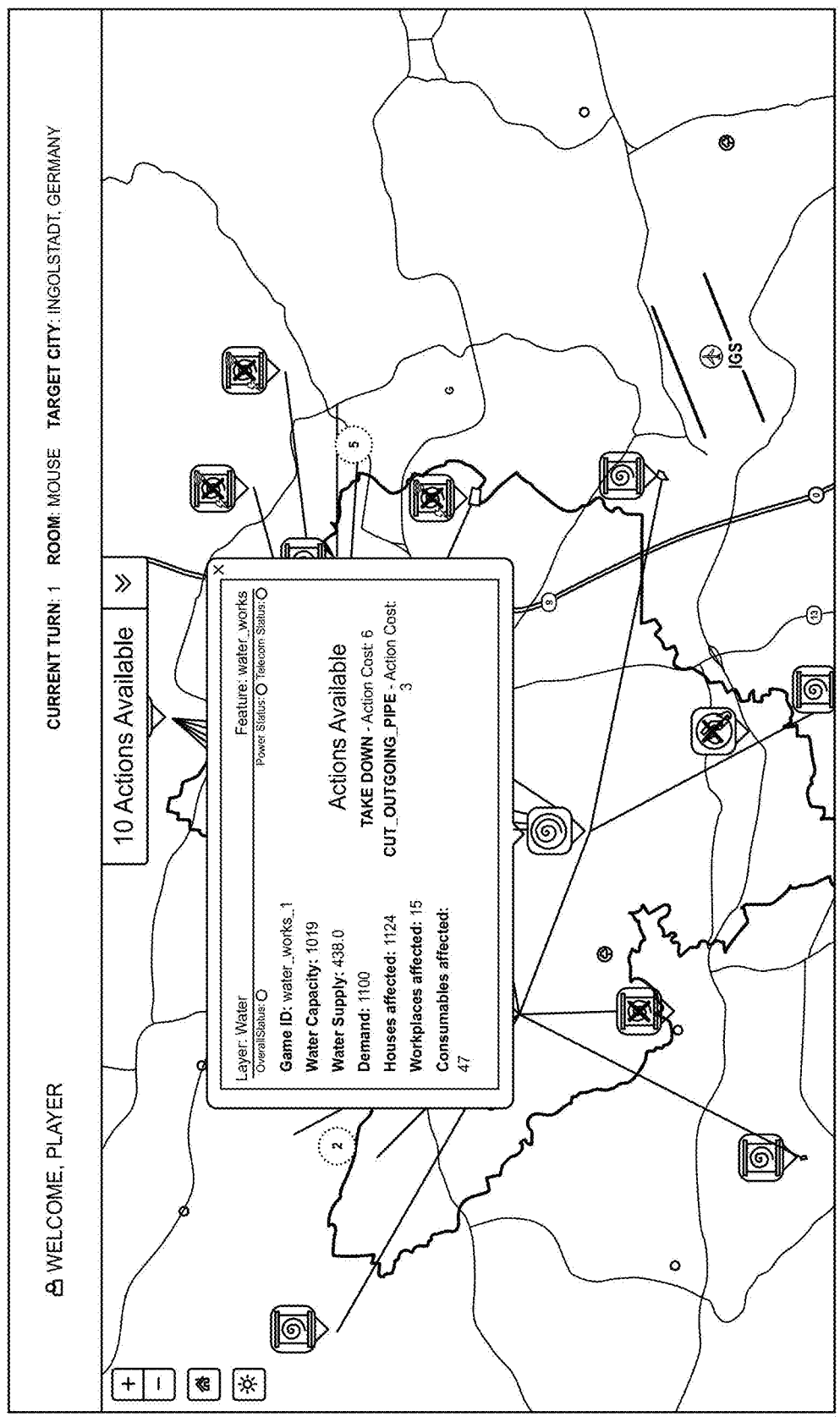
Figure 6P:
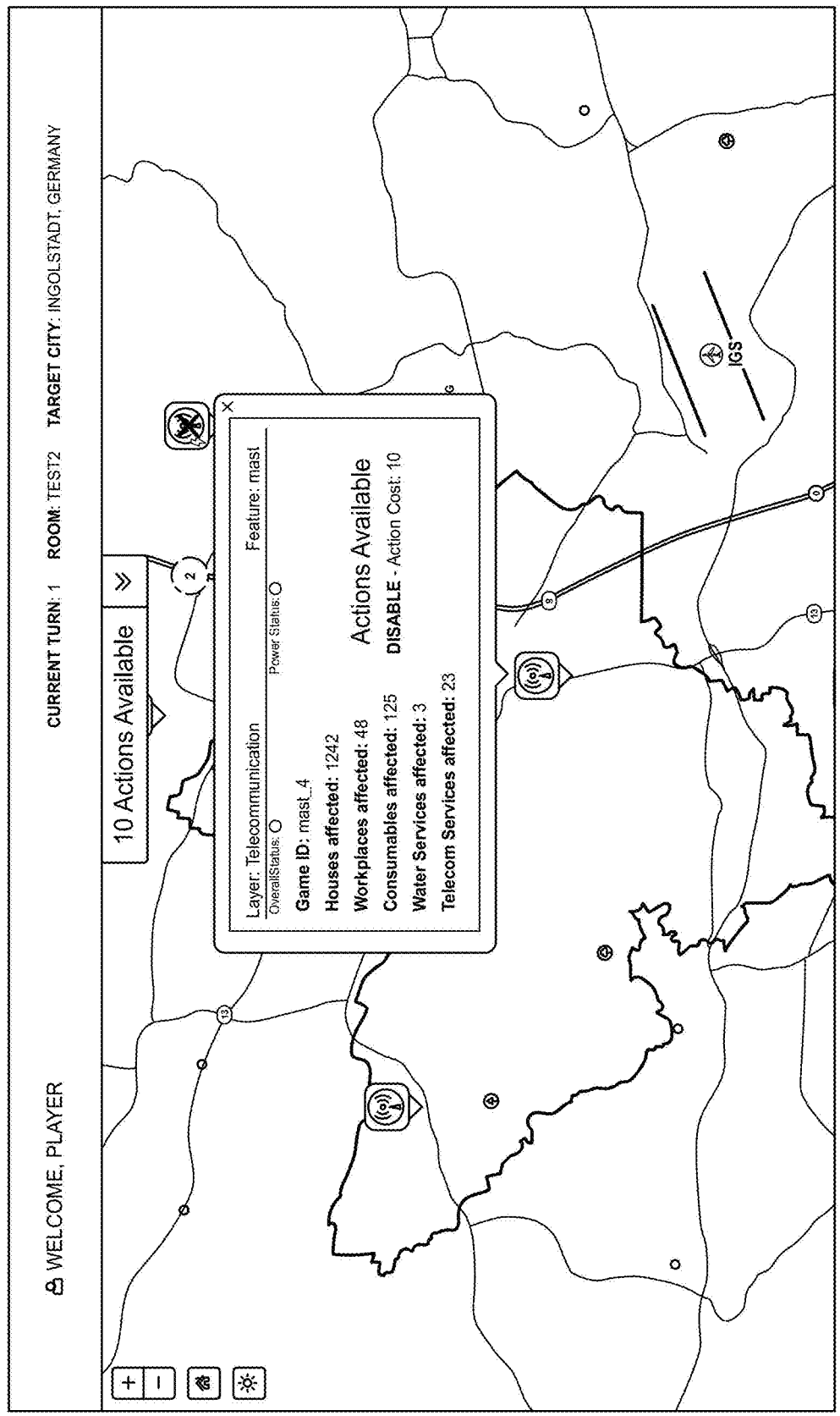

FIGS. 6A-6P depict a user interface for viewing and controlling a multi-layer simulation, in accordance with some embodiments. Each of FIGS. 6A-6P depict a different screen of the same user interface.

FIG. 6A shows a map view of a multi-layer simulation of the city of Ingolstadt, Germany.

FIG. 6B shows a systems overview popup that shows six layers of the simulation, three of which are healthy and three of which are compromised.

FIG. 6C shows a user's selection of available actions to be executed against the simulation; the user has selected to close element "pub_1" and to take down element "substation_53".

FIG. 6D shows an electrical layer popup that shows information about the electrical layer, indicating 56/76 infrastructure elements in the layer as active and the layer status as compromised.

FIG. 6E shows an electrical layer view showing different overlay information than the view in FIG. 6D. As shown, the view in FIG. 6E shows more information about an electrical generator than was shown in FIG. 6E. In some embodiments, zooming in or out may cause more or less information about one or more infrastructure elements to be displayed in accordance with the zoom level.

FIG. 6F shows an electrical layer view showing different overlay information than the view in either FIG. 6D or FIG. 6E.

FIG. 6G shows an electrical layer view showing certain overlay information (e.g., icons) disabled, hidden, or turned off. In some embodiments, a user may be able to manually hide or unhide certain overlay information, or the system may automatically determine to hide or unhide certain overlay information.

FIG. 6H shows a fuel layer popup that shows information about the fuel layer, indicating 33/41 infrastructure elements in the layer as active and the layer status as healthy.

FIG. 6I shows a water layer popup that shows information about the water layer, indicating 14/25 infrastructure elements in the layer as active and the layer status as compromised.

FIG. 6J shows a traffic (e.g., transportation) layer popup that shows information about the traffic (e.g., transportation) layer, indicating 370/411 infrastructure elements in the layer as active.

FIG. 6K shows a telecommunication (e.g., communications) layer popup that shows information about the telecommunication (e.g., communications) layer, indicating 3/7 infrastructure elements in the layer as active and the layer status as compromised.

FIG. 6L shows a consumables layer popup that shows information about the consumables layer, indicating 447/515 infrastructure elements in the layer as active and the layer status as healthy.

FIG. 6M shows a generator popup that shows information about a generator element in the electrical layer. The popup shows the overall status (healthy), various sub-statuses (power status healthy, telecom status healthy), and various characteristics of the element, such as its ID, the number of elements in various other layers affected by the element, and actions available to be executed against the element. When the system detects an input from a user indicating the element, such as clicking on the element on the map view, the popup may be shown.

FIG. 6N shows a fuel popup that shows information about a fuel element in the fuel layer. The popup shows the overall status (healthy), various sub-statuses (power status healthy, water status compromised, telecom status healthy), and various characteristics of the element, such as its ID, fuel available, refresh rate, and actions available to be executed against the element. When the system detects an input from a user indicating the element, such as clicking on the element on the map view, the popup may be shown.

FIG. 6O shows a water_works popup that shows information about a water_works element in the water layer. The popup shows the overall status (healthy), various sub-statuses (power status healthy, telecom status healthy), and various characteristics of the element, such as its ID, water capacity, water supply, demand, the number of elements in various other layers affected by the element, and actions available to be executed against the element. When the system detects an input from a user indicating the element, such as clicking on the element on the map view, the popup may be shown.

FIG. 6P shows a mast popup that shows information about a mast element in the telecommunications layer. The popup shows the overall status (healthy), a sub-status (power status healthy), and various characteristics of the element, such as its ID, the number of elements in various other layers affected by the element, and actions available to be executed against the element. When the system detects an input from a user indicating the element, such as clicking on the element on the map view, the popup may be shown.

In some embodiments, a restaurant popup shows information about a restaurant element in the consumables layer. A restaurant popup may show an overall status (healthy), various sub-statuses (power status healthy, water status compromised, telecom status healthy), and various characteristics of the element, such as its ID, food available, refresh rate, and actions available to be executed against the element. When the system detects an input from a user indicating the element, such as clicking on the element on the map view, a restaurant popup may be shown.

FIGS. 7A-7G depict various user interface screens for viewing and controlling a multi-layer simulation, in accordance with some embodiments. In some embodiments, one or more of the screens shown in FIGS. 7A-7G may be a different screen of the same user interface. In some embodiments, the user interface screens depicted in FIGS. 7A-7G may share any one or more characteristics or features in common with the user interface screens depicted in FIGS. 6A-6P, and may be combined in whole or in part with all or part of the user interface screens depicted in FIGS. 6A-6P. As shown in FIGS. 7A-7G, the user interface screens depicted in FIGS. 7A-7G may differ from the user interface screens depicted in FIGS. 6A-6P in that the screens shown in FIGS. 7A-7G may comprise three-dimensional renderings of a simulated environment, including three-dimensional renderings of one or more simulated layers. A user of the interface(s) shown in FIGS. 7A-7G may be able to interact with the interface(s) to navigate the simulated environment in three dimensions.

Figure 7A:
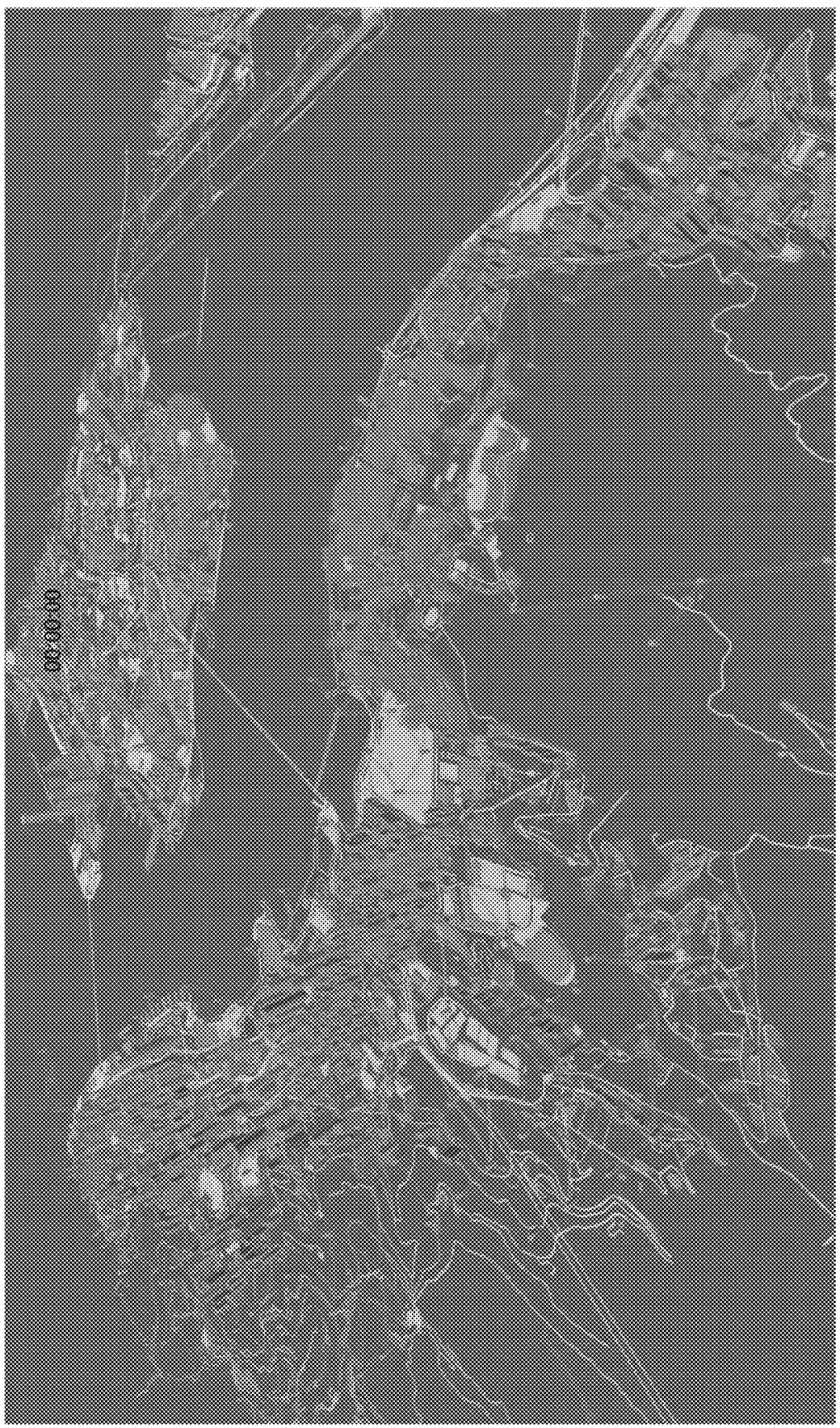
FIGS. 7A-7F depict various user interface screens for viewing and controlling a multi-layer simulation, in accordance with some embodiments.

FIG. 7A shows a three-dimensional map view of a multilayer simulation of Hong Kong. As shown in FIG. 7A, different layers may be depicted in three dimensions using different colored three-dimensional overlays.

Figure 7B:

FIG. 7B shows a three-dimensional map view of a multilayer simulation of Hong Kong, where one or more layers are hidden (e.g., not displayed) such that only three-dimensional renderings of the buildings in Hong Kong are displayed. In some embodiments, data used to render the three-dimensional rendering of buildings may be received from one or more private and/or open source sources, such as from Open Street Map. In some embodiments, LIDAR data may be used in addition to and/or in place of open-source data such as Open Street Map, to provide more detailed building structures that may be rendered in greater detail and in higher resolution in the three-dimensional renderings. In some embodiments, LIDAR data may be received by the system from one or more public or private databases, and/or from one or more real-time data sources, including but not limited to the National Reconnaissance Office (NRO), the National Geospatial-Intelligence Agency (NGA), and/or military sources such as military drones.

Figure 7C:
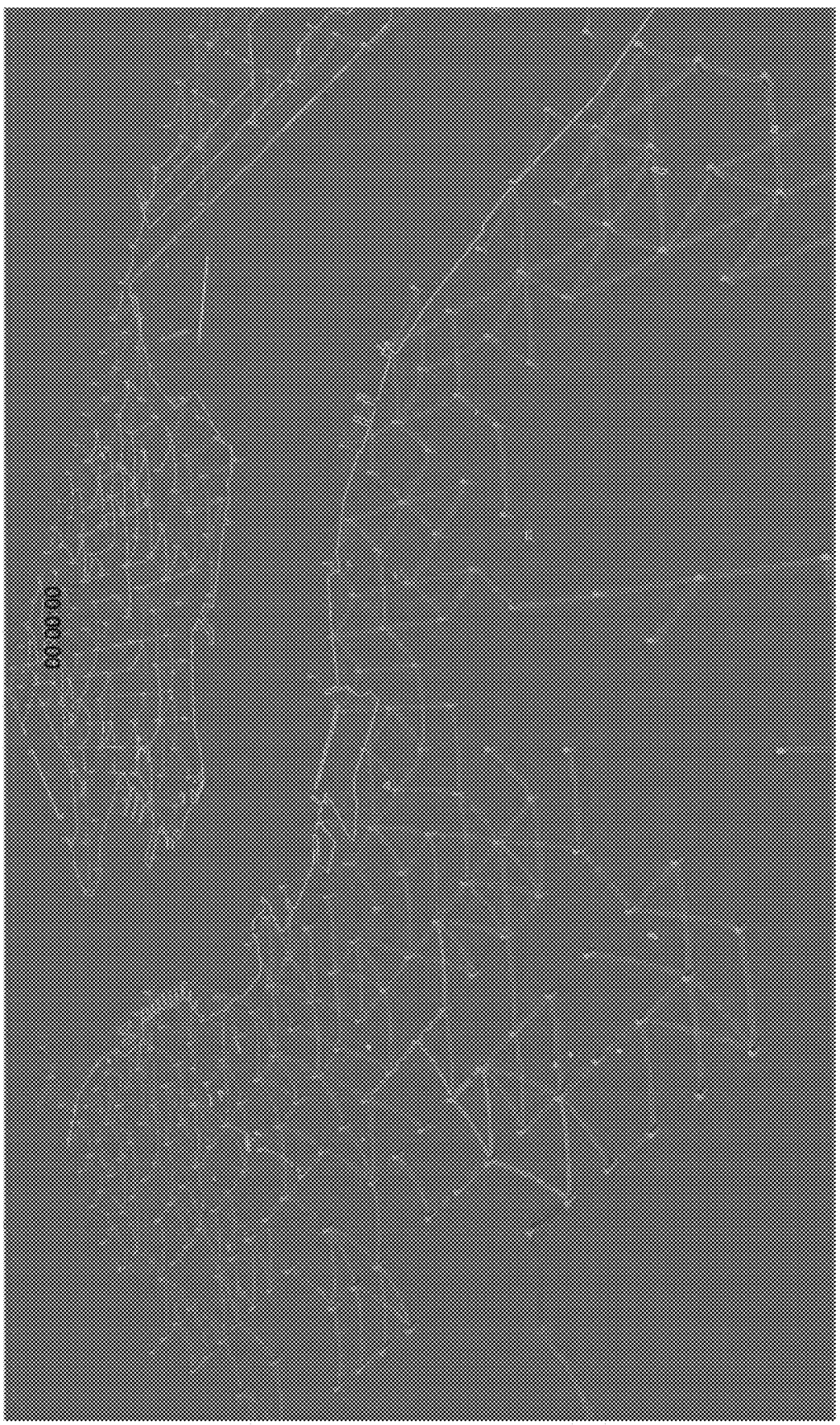

FIG. 7C shows a three-dimensional map view of a multilayer simulation of Hong Kong, where one or more layers are hidden (e.g., not displayed) such that only hypothetical three-dimensional renderings of an electrical layer are shown. In some embodiments, a simulated electrical grid may be simulated, in whole or in part, based on the geographic location of buildings in a region and/or boundaries of a region. In the rendering of the electrical layer shown in FIG. 7C, the pink nodes mark electrical substations that are connected to one another via electrical wires, which are shown as lines of various colors.

In some embodiments, color-coding may be used to show electrical usage for electrical lines. For example, in the rendering shown, the color of the wires indicates power usage relative to capacity, with green indicating lower usage (e.g., below a predetermined percentage of capacity), yellow indicating intermediate usage/orange (e.g., above the predetermined low-usage percentage of capacity but below a predetermined high-usage percentage of capacity), and red indicating higher usage (e.g., above the predetermined high-usage percentage of capacity). A respective simulated power station may be simulated for each side of the simulated region shown in FIG. 7C; in the example of FIG. 7C, the power grid for the city is split into two parts by the river shown.

Figure 7D:
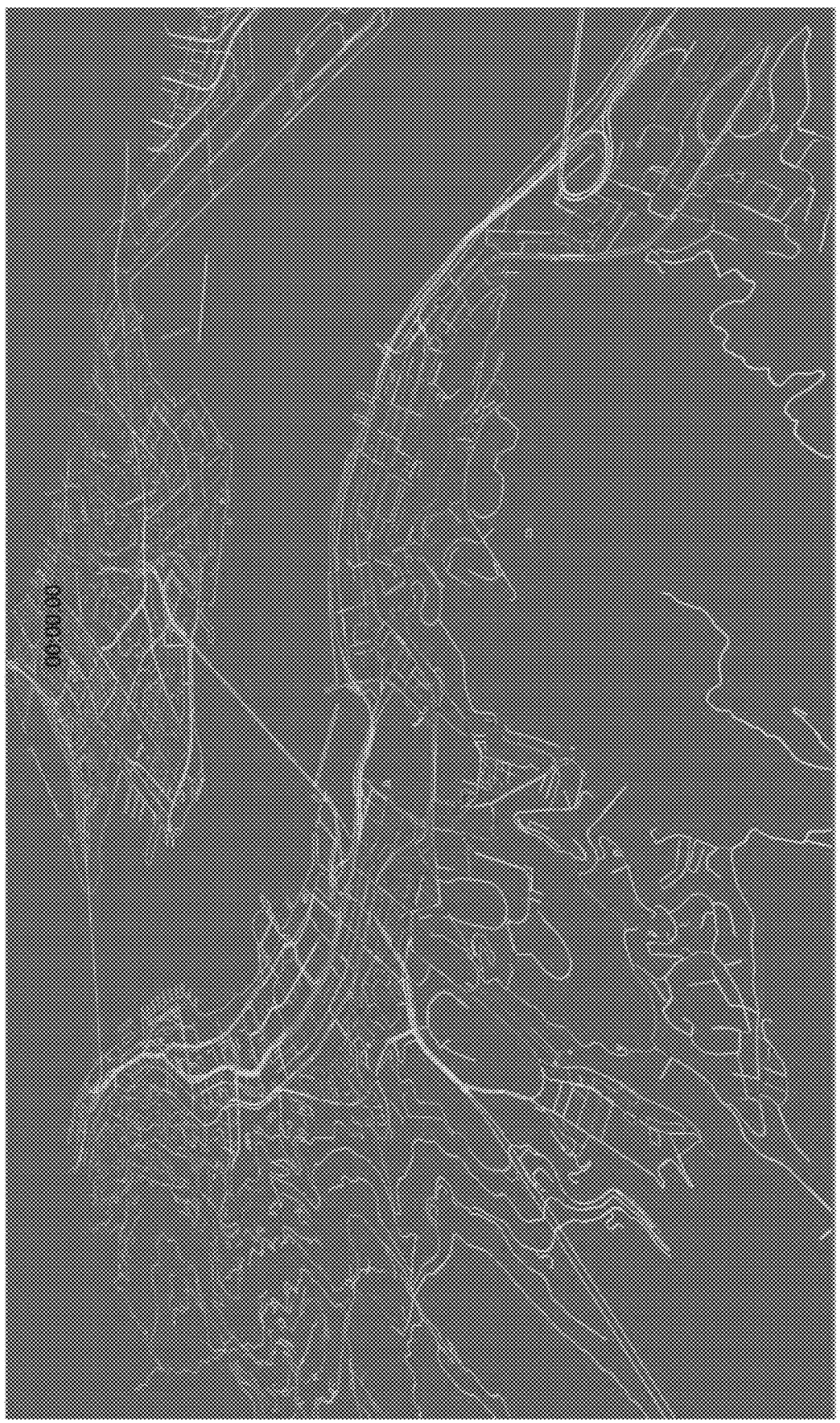

FIG. 7D shows a three-dimensional map view of a multilayer simulation of Hong Kong, where one or more layers are hidden (e.g., not displayed) such that only three-dimensional renderings of a transportation layer are shown. As shown, the three-dimensional renderings of the transportation layer include a representation of Hong Kong's road network. In some embodiments, a simulated roadway network and/or vehicle behavior thereon may be simulated, in whole or in part, based on zoning data (e.g., as shown below with reference to FIG. 7E), such as by simulating vehicles migrating from residential zones to commercial or industrial zones in accordance with patterns consistent with daily commutes. In some embodiments, simulated vehicles may be routed according to an algorithm such as a Contraction Hierarchies algorithm, which may calculate the shortest path to a vehicle's destination.

In some embodiments, color-coding may be used to display traffic density on roadways. For example, in the rendering shown, the color of the roadways indicates density of vehicles on segments of the roadway, with red indicating high density, yellow/orange indicating moderate density, green indicating low density, and gray indicating little to no traffic. The displayed color of the roadway segments may, in some embodiments, be determined in accordance with whether a density for the roadway segment falls above and/or below one or more density thresholds. In some embodiments, the density thresholds determining the color to display may be the same for all roadway segments, while in some embodiments the threshold levels may differ between different roadway segments.

Figure 7E:
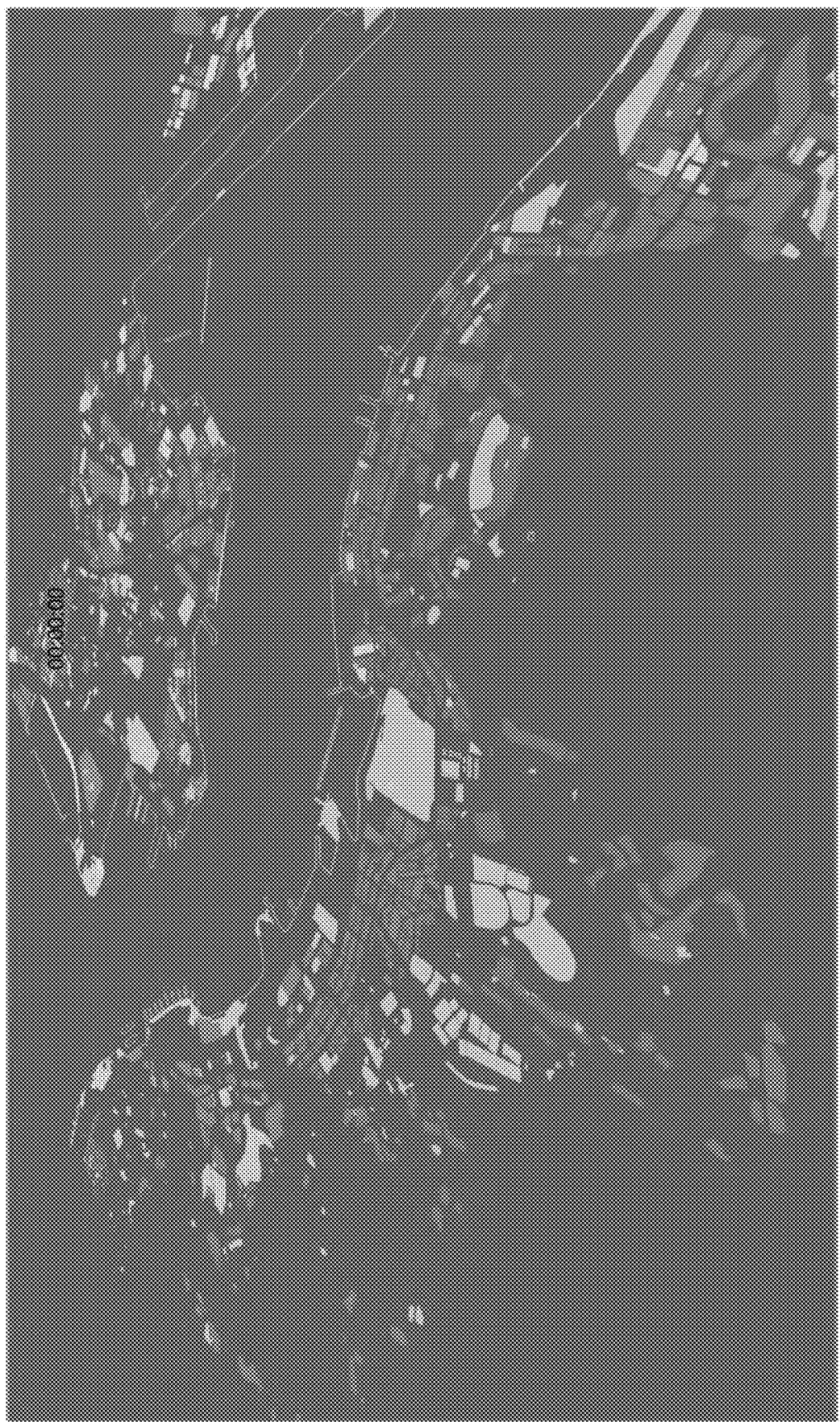

FIG. 7E shows a three-dimensional map view of a multilayer simulation of Hong Kong, where one or more layers are hidden (e.g., not displayed) such that three-dimensional renderings of a land use/zoning information are shown. In some embodiments, land use/zoning information may be stored as part of an agent model, such that the system may determine by reference to the agent model the land use/zoning information about an area in which an individual agent is stationed and/or the land use/zoning information about an area to which an agent intends to travel. In some embodiments, land use/zoning information may be referenced by one or more other layers, for example to determine things like electrical usage in different zoning areas. In some embodiments, land use/zoning information may be stored as a layer unto itself that may interact with one or more other layers, for example, in the manner described elsewhere herein. In some embodiments, data used to render the three-dimensional rendering of land use/zoning may be received from one or more private and/or open source sources, such as from Open Street Map. In some embodiments, zones such as land use zones may be useful in understanding traffic behavior. For example, simulated vehicles in a transportation layer may be configured to be powered by agents, which may be configured to migrate between residential, commercial, and/or industrial zones, for example in accordance with patterns consistent with daily commutes.

In some embodiments, color-coding may be used to display zones, such as land use zones. For example, in FIG. 7E, residential zones are shown in purple, commercial zones are shown in pink, industrial zones are shown in yellow, and leisure zones are shown in green. In some embodiments, any suitable number of different kinds of zones may be designated, in accordance with the data received and used to generate the simulated environment.

Figure 7F:

FIG. 7F shows a three-dimensional map view of a multilayer simulation of Hartsfield-Jackson Atlanta International Airport, wherein the simulation includes an airplane flying in the simulation environment. In some embodiments, a simulated environment may be generated in accordance with flight data, such as data received from the FAA System Wide Information Management (SWIM) system. Three-dimensional renderings of one or more airplanes may then be rendered as part of the simulated environment, and may be displayed in the simulated environment at an accurate latitude, longitude, altitude, and/or heading based on the data. In some embodiments, airplanes may be displayed in the simulated environment along with a representation of a respective aircraft identification. In the example shown in FIG. 7F, an aircraft is shown with alphanumeric aircraft identification "SKW3528."

FIG. 8 illustrates a computer, in accordance with some embodiments. Computer 800 can be a component of a system for providing integrated multi-layer CPS simulations, such as system 100 and/or any of its subcomponents described above with respect to FIG. 1. In some embodiments, computer 800 is configured to execute a method for providing, creating, and/or executing integrated multi-layer CPS simulations, such as all or part of methods 200 and/or 500 of FIGS. 2 and 5, respectively. In some embodiments, computer 800 may be configured to serve as a terminal for displaying and/or controlling an integrated multi-layer CPS simulation, such as terminals 106 and/or 108 in FIG. 1. In some embodiments, computer 800 may be configured to display a user interface for viewing and/or controlling a multi-layer simulation, such as the user interface depicted in FIGS. 6A-6P.

Computer 800 can be a host computer connected to a network. Computer 800 can be a client computer or a server. As shown in FIG. 8, computer 800 can be any suitable type of microprocessor-based device, such as a personal computer; workstation; server; or handheld computing device, such as a phone or tablet. The computer can include, for example, one or more of processor 810, input device 820, output device 830, storage 840, and communication device 860.

Input device 820 can be any suitable device that provides input, such as a touch screen or monitor, keyboard, mouse, or voice-recognition device. Output device 830 can be any suitable device that provides output, such as a touch screen, monitor, printer, disk drive, or speaker.

Storage 840 can be any suitable device that provides storage, such as an electrical, magnetic, or optical memory, including a RAM, cache, hard drive, CD-ROM drive, tape drive, or removable storage disk. Communication device 860 can include any suitable device capable of transmitting and receiving signals over a network, such as a network interface chip or card. The components of the computer can be connected in any suitable manner, such as via a physical bus or wirelessly. Storage 840 can be a non-transitory computer-readable storage medium comprising one or more programs, which, when executed by one or more processors, such as processor 810, cause the one or more processors to execute methods described herein, such as all or part of methods 300, 400, or 500 described with respect to FIGS. 3, 4, and 5, respectively.

Software 850, which can be stored in storage 840 and executed by processor 810, can include, for example, the programming that embodies the functionality of the present disclosure (e.g., as embodied in the systems, computers, servers, and/or devices as described above). In some embodiments, software 850 can be implemented and executed on a combination of servers such as application servers and database servers.

Software 850 can also be stored and/or transported within any computer-readable storage medium for use by or in connection with an instruction execution system, apparatus, or device, such as those described above, that can fetch and execute instructions associated with the software from the instruction execution system, apparatus, or device. In the context of this disclosure, a computer-readable storage medium can be any medium, such as storage 840, that can contain or store programming for use by or in connection with an instruction execution system, apparatus, or device.

Software 850 can also be propagated within any transport medium for use by or in connection with an instruction execution system, apparatus, or device, such as those described above, that can fetch and execute instructions associated with the software from the instruction execution system, apparatus, or device. In the context of this disclosure, a transport medium can be any medium that can communicate, propagate, or transport programming for use by or in connection with an instruction execution system, apparatus, or device. The transport-readable medium can include, but is not limited to, an electronic, magnetic, optical, electromagnetic, or infrared wired or wireless propagation medium.

Computer 800 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Computer 800 can implement any operating system suitable for operating on the network. Software 850 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. A system for simulating cyber-physical systems using a multi-layer data structure, comprising:

one or more processors; and
memory storing one or more programs, wherein the one or more programs are configured to be executable by the one or more processors to cause the system to:
receive, at the system, data representing infrastructure elements in a real-world environment, wherein the plurality of infrastructure elements represented in the data are associated with respective geographic metadata in the data;
generate and store a plurality of geographic simulation layers representing the real-world environment, based on the received data;
for each simulation layer of the plurality of simulation layers, generate and store data representing associations of each of a first plurality of infrastructure elements in the layer with each of a second plurality of infrastructure elements across two or more other simulation layers of the plurality of simulation layers, based on the geographic metadata associated with the first plurality of infrastructure elements and on the geographic metadata associated with the second plurality of infrastructure elements, wherein the generating and storing the data representing the associations comprises associating a pair of infrastructure elements with one another if the geographic metadata respectively associated with each of the pair of infrastructure elements indicates that the pair of infrastructure elements are within a predefined geographical distance of one another;
execute a first multi-layer simulation based on the data representing the associations between the plurality of simulation layers;
modifying the data representing the associations between the plurality of simulation layers; and
execute a second multi-layer simulation, based on the modified data representing the associations between the plurality of simulation layers.

2. The system of claim 1, wherein each of the plurality of geographic simulation layers represents a different one of a plurality of infrastructure sectors of the real-world environment.

3. The system of claim 2, wherein the plurality of infrastructure sectors comprise three or more of an electrical sector, a transportation sector, a communications sector, a water sector, a fuel sector, and a consumables sector.

4. The system of claim 1, wherein modifying the data representing the associations between the plurality of simulation layers is based on information about the real-world environment received after execution of the first multi-layer simulation.

5. The system of claim 1, wherein modifying the data representing the associations between the plurality of simulation layers is based on comparing characteristics of the first multi-layer simulation to characteristics of the real-world environment.

6. The system of claim 5, wherein modifying the data representing the associations between the plurality of simulation layers comprises modifying the data such characteristics of the second multi-layer simulation are more similar than the characteristics of the first multi-layer simulation to characteristics of the real-world environment.

7. The system of claim 1, wherein modifying the data representing the associations between the plurality of simulation layers comprises one or more of associating one or more elements with one another that were not previously associated, disassociating one or more elements with one another that were previously associated, or modifying a manner in which one or more elements are associated with one another.

8. A system for simulating cyber-physical systems using a multi-layer data structure, comprising:
one or more processors; and
memory storing one or more programs, wherein the one or more programs are configured to be executable by the one or more processors to cause the system to:
receive, at the system, data representing infrastructure elements in a real-world environment, wherein the plurality of infrastructure elements represented in the data are associated with respective geographic metadata in the data;
generate and store a plurality of geographic simulation layers representing the real-world environment, based on the received data;
for each simulation layer of the plurality of simulation layers, generate and store data representing associations of each of a first plurality of infrastructure elements in the layer with each of a second plurality of infrastructure elements across two or more other simulation layers of the plurality of simulation layers, based on the geographic metadata associated with the first plurality of infrastructure elements and on the geographic metadata associated with the second plurality of infrastructure elements, wherein the generating and storing the data representing the associations comprises not associating a pair of infrastructure elements with one another if the geographic metadata respectively associated with each of the pair of infrastructure elements indicates that the pair of infrastructure elements are not within a predefined geographical distance of one another;
execute a first multi-layer simulation based on the data representing the associations between the plurality of simulation layers;
modifying the data representing the associations between the plurality of simulation layers; and
execute a second multi-layer simulation, based on the modified data representing the associations between the plurality of simulation layers.

9. A system for simulating cyber-physical systems using a multi-layer data structure, comprising:
one or more processors; and
memory storing one or more programs, wherein the one or more programs are configured to be executable by the one or more processors to cause the system to:
receive, at the system, data representing infrastructure elements in a real-world environment, wherein the plurality of infrastructure elements represented in the data are associated with respective geographic metadata in the data;
generate and store a plurality of geographic simulation layers representing the real-world environment, based on the received data;
for each simulation layer of the plurality of simulation layers, generate and store data representing associations of each of a first plurality of infrastructure elements in the layer with each of a second plurality of infrastructure elements across two or more other simulation layers of the plurality of simulation layers, based on the geographic metadata associated with the first plurality of infrastructure elements and on the geographic metadata associated with the second plurality of infrastructure elements, wherein the generating and storing the data representing the associations comprises assigning an intensity to an association between a pair of infrastructure elements on the basis of the geographic distance between the pair of infrastructure elements indicated by the metadata respectively associated with each of the pair of infrastructure elements;

execute a first multi-layer simulation based on the data representing the associations between the plurality of simulation layers;

modifying the data representing the associations between the plurality of simulation layers; and execute a second multi-layer simulation, based on the modified data representing the associations between the plurality of simulation layers.

10. A method for simulating cyber-physical systems on a simulation system using a multi-layer data structure, comprising:

receiving, at the simulation system, data representing infrastructure elements in a real-world environment, wherein the plurality of infrastructure elements represented in the data are associated with respective geographic metadata in the data;

generating and storing a plurality of geographic simulation layers representing the real-world environment, based on the received data;

for each simulation layer of the plurality of simulation layers, generating and storing data representing associations of each of a first plurality of infrastructure elements in the layer with each of a second plurality of infrastructure elements across two or more other simulation layers of the plurality of simulation layers, based on the geographic metadata associated with the first plurality of infrastructure elements and on the geographic metadata associated with the second plurality of infrastructure elements, wherein the generating and storing the data representing the associations comprises associating a pair of infrastructure elements with one another if the geographic metadata respectively associated with each of the pair of infrastructure elements indicates that the pair of infrastructure elements are within a predefined geographical distance of one another;

executing a first multi-layer simulation based on the data representing the associations between the plurality of simulation layers;

modifying the data representing the associations between the plurality of simulation layers; and executing a second multi-layer simulation, based on the modified data representing the associations between the plurality of simulation layers.

11. A non-transitory computer-readable storage medium for simulating cyber-physical systems using a multi-layer data structure, the non-transitory computer-readable storage medium comprising instructions configured to be executed by one or more processors to cause the one or more processors to:

receive, at the system, data representing infrastructure elements in a real-world environment, wherein the plurality of infrastructure elements represented in the data are associated with respective geographic metadata in the data;

generate and store a plurality of geographic simulation layers representing the real-world environment, based on the received data;

for each simulation layer of the plurality of simulation layers, generate and store data representing associations of each of a first plurality of infrastructure elements in the layer with each of a second plurality of infrastructure elements across two or more other simulation layers of the plurality of simulation layers, based on the geographic metadata associated with the first plurality of infrastructure elements and on the geographic metadata associated with the second plurality of infrastructure elements, wherein the generating and storing the data representing the associations comprises associating a pair of infrastructure elements with one another if the geographic metadata respectively associated with each of the pair of infrastructure elements indicates that the pair of infrastructure elements are within a predefined geographical distance of one another;

execute a first multi-layer simulation based on the data representing the associations between the plurality of simulation layers;

modifying the data representing the associations between the plurality of simulation layers; and execute a second multi-layer simulation, based on the modified data representing the associations between the plurality of simulation layers.

12. A method for simulating cyber-physical systems on a simulation system using a multi-layer data structure, comprising:

receiving, at the simulation system, data representing infrastructure elements in a real-world environment, wherein the plurality of infrastructure elements represented in the data are associated with respective geographic metadata in the data;

generating and storing a plurality of geographic simulation layers representing the real-world environment, based on the received data;

for each simulation layer of the plurality of simulation layers, generating and storing data representing associations of each of a first plurality of infrastructure elements in the layer with each of a second plurality of infrastructure elements across two or more other simulation layers of the plurality of simulation layers, based on the geographic metadata associated with the first plurality of infrastructure elements and on the geographic metadata associated with the second plurality of infrastructure elements, wherein the generating and storing the data representing the associations comprises not associating a pair of infrastructure elements with one another if the geographic metadata respectively associated with each of the pair of infrastructure elements indicates that the pair of infrastructure elements are not within a predefined geographical distance of one another;

executing a first multi-layer simulation based on the data representing the associations between the plurality of simulation layers;

modifying the data representing the associations between the plurality of simulation layers; and executing a second multi-layer simulation, based on the modified data representing the associations between the plurality of simulation layers.

13. A non-transitory computer-readable storage medium for simulating cyber-physical systems using a multi-layer data structure, the non-transitory computer-readable storage medium comprising instructions configured to be executed by one or more processors to cause the one or more processors to:

receive, at the system, data representing infrastructure elements in a real-world environment, wherein the plurality of infrastructure elements represented in the data are associated with respective geographic metadata in the data;

generate and store a plurality of geographic simulation layers representing the real-world environment, based on the received data;

for each simulation layer of the plurality of simulation layers, generate and store data representing associations of each of a first plurality of infrastructure elements in the layer with each of a second plurality of infrastructure elements across two or more other simulation layers of the plurality of simulation layers, based on the geographic metadata associated with the first plurality of infrastructure elements and on the geographic metadata associated with the second plurality of infrastructure elements, wherein the generating and storing the data representing the associations comprises not associating a pair of infrastructure elements with one another if the geographic metadata respectively associated with each of the pair of infrastructure elements indicates that the pair of infrastructure elements are not within a predefined geographical distance of one another;

execute a first multi-layer simulation based on the data representing the associations between the plurality of simulation layers;

modifying the data representing the associations between the plurality of simulation layers; and execute a second multi-layer simulation, based on the modified data representing the associations between the plurality of simulation layers.

14. A method for simulating cyber-physical systems on a simulation system using a multi-layer data structure, comprising:

receiving, at the simulation system, data representing infrastructure elements in a real-world environment, wherein the plurality of infrastructure elements represented in the data are associated with respective geographic metadata in the data;

generating and storing a plurality of geographic simulation layers representing the real-world environment, based on the received data;

for each simulation layer of the plurality of simulation layers, generating and storing data representing associations of each of a first plurality of infrastructure elements in the layer with each of a second plurality of infrastructure elements across two or more other simulation layers of the plurality of simulation layers, based on the geographic metadata associated with the first plurality of infrastructure elements and on the geographic metadata associated with the second plurality of infrastructure elements, wherein the generating and storing the data representing the associations comprises assigning an intensity to an association between a pair of infrastructure elements on the basis of the geographic distance between the pair of infrastructure elements indicated by the metadata respectively associated with each of the pair of infrastructure elements;

executing a first multi-layer simulation based on the data representing the associations between the plurality of simulation layers;

modifying the data representing the associations between the plurality of simulation layers; and executing a second multi-layer simulation, based on the modified data representing the associations between the plurality of simulation layers.

15. A non-transitory computer-readable storage medium for simulating cyber-physical systems using a multi-layer data structure, the non-transitory computer-readable storage medium comprising instructions configured to be executed by one or more processors to cause the one or more processors to:

receive, at the system, data representing infrastructure elements in a real-world environment, wherein the plurality of infrastructure elements represented in the data are associated with respective geographic metadata in the data;

generate and store a plurality of geographic simulation layers representing the real-world environment, based on the received data;

for each simulation layer of the plurality of simulation layers, generate and store data representing associations of each of a first plurality of infrastructure elements in the layer with each of a second plurality of infrastructure elements across two or more other simulation layers of the plurality of simulation layers, based on the geographic metadata associated with the first plurality of infrastructure elements and on the geographic metadata associated with the second plurality of infrastructure elements, wherein the generating and storing the data representing the associations comprises assigning an intensity to an association between a pair of infrastructure elements on the basis of the geographic distance between the pair of infrastructure elements indicated by the metadata respectively associated with each of the pair of infrastructure elements;

execute a first multi-layer simulation based on the data representing the associations between the plurality of simulation layers;

modifying the data representing the associations between the plurality of simulation layers; and execute a second multi-layer simulation, based on the modified data representing the associations between the plurality of simulation layers.

\* \* \* \* \*